(12) United States Patent
Dennison et al.

(10) Patent No.: US 10,789,194 B2
(45) Date of Patent: Sep. 29, 2020

(54) TECHNIQUES FOR EFFICIENTLY SYNCHRONIZING DATA TRANSMISSIONS ON A NETWORK

(71) Applicant: NVIDIA Corporation, Santa Clara, CA (US)

(72) Inventors: Larry R. Dennison, Mendon, MA (US); Mark Hummel, Franklin, MA (US); Glenn Dearth, Groton, MA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 16/364,565

(22) Filed: Mar. 26, 2019

(65) Prior Publication Data

US 2019/0294575 A1 Sep. 26, 2019

Related U.S. Application Data

(60) Provisional application No. 62/648,333, filed on Mar. 26, 2018.

(51) Int. Cl.
| | | |
|---|---|---|
| *G06F 13/40* | (2006.01) | |
| *G06F 3/06* | (2006.01) | |
| *G06F 13/00* | (2006.01) | |
| *G06F 9/38* | (2018.01) | |
| *G06F 12/0891* | (2016.01) | |

(52) U.S. Cl.
CPC ........ *G06F 13/4022* (2013.01); *G06F 9/3877* (2013.01); *G06F 12/0891* (2013.01); *G06F 2213/0026* (2013.01)

(58) Field of Classification Search
CPC ............ G06F 13/40; G06F 3/06; G06F 13/00
See application file for complete search history.

(56) References Cited

U.S. PATENT DOCUMENTS

| | | | | |
|---|---|---|---|---|
| 6,557,048 B1* | 4/2003 | Keller | ................ | G06F 13/4059 |
| | | | | 710/58 |
| 2005/0235067 A1* | 10/2005 | Creta | .................. | G06F 13/4027 |
| | | | | 710/5 |
| 2007/0234018 A1* | 10/2007 | Feiste | ................... | G06F 9/3867 |
| | | | | 712/229 |
| 2014/0181397 A1* | 6/2014 | Bonzini | .............. | G06F 11/2097 |
| | | | | 711/112 |
| 2016/0182241 A1* | 6/2016 | Chin | ....................... | H04L 51/28 |
| | | | | 370/390 |
| 2017/0123656 A1* | 5/2017 | Benisty | ................. | G06F 3/0688 |

* cited by examiner

*Primary Examiner* — David E Martinez
(74) *Attorney, Agent, or Firm* — Nixon & Vanderhye, P.C.

(57) ABSTRACT

Systems and techniques for synchronizing transactions between processing devices on an interconnection network are provided. Upon receiving a stream of posted transactions followed by a flush transaction from a source processing device connected to the interconnection network, the flush transaction is trapped before it enters the interconnecting network. Subsequently, based on monitoring for responses received from a destination processing device for transactions corresponding to the posted transactions, a flush response is generated and returned to the source processing device. The described techniques enable efficient synchronizing posted writes, posted atomics and the like over complex interconnection fabrics such that a first GPU can write data to a second GPU so that a third GPU can safely consume the data written to the second GPU.

23 Claims, 14 Drawing Sheets

TECHNIQUES FOR EFFICIENTLY SYNCHRONIZING DATA TRANSMISSIONS ON A NETWORK

CROSS REFERENCE TO RELATED APPLICATIONS

This application claims priority to U.S. Provisional Application No. 62/648,333 filed on Mar. 26, 2018, the contents of which is hereby incorporated by reference in its entirety.

This invention was made with U.S. Government support under Agreement H98230-16-3- 0001 awarded by DoD. The U.S. Government has certain rights in this invention.

TECHNICAL FIELD

This disclosure relates generally to network synchronization, and more particularly to using tracking operations to synchronize operations on multiple interconnected devices.

BACKGROUND

Systems with multiple graphics processing units (GPUs) and/or central processing units (CPUs) are becoming common in a variety of industries as developers rely on more parallelism in applications such as artificial intelligence computing (e.g., machine learning, autonomous vehicles, predictive analytics etc.), very large scale modeling and the like. These systems often include multi-GPU configurations using PCI Express (Peripheral Component Interconnect Express or "PCIe") system interconnects to solve very large, complex problems. PCIe is a multi-lane, high-speed serial computer expansion bus standard commonly used on personal computer motherboards to interconnect CPUs with graphics cards, hard drives, communications adapters and the like. PCIe interconnect bandwidth is increasingly becoming a bottleneck for high performance computing devices such as multi-GPU systems.

Some recent multi-GPU systems use faster and more scalable multiprocessor interconnect interfaces such as NVIDIA's NVLINK® or other high bandwidth interconnect for connection among the multiple GPUs and, at least in some implementations, the CPU. Some of these high bandwidth interfaces enable each GPU to connect to the system using multiple links enabling very high bandwidth (e.g. at multiple times the maximum bandwidth provided by PCIe) operations between GPUs, supports non-tree interconnect topologies, and reduces industry and legacy encumbrances on interconnect topologies.

Many interconnect bus technologies, including PCI, PCIe, and NVLINK, allow the use of non-posted transactions and posted transactions for communication between the multiple connected devices. Non-posted transactions typically include memory reads and the like, and require the target to respond to each transaction. The sender of a non-posted read request, for example, may send the read command and the read address, and expect to receive an acknowledgment and/or the read data. However, since an acknowledgment or the like in response to each transaction may incur a high overhead in some environments, posted transactions are used for most writes (and also some other operations). The sender of posted writes can transmit several posted write transactions in sequence without pausing for an acknowledgment or completion signal. For example, the sender of posted writes can signal the write operation, the source data and the write address for several writes in a sequence without waiting for a response. Posted transactions may provide the capability to write faster, and also better pipelining. Write operations, however, may not be the only type of posted transaction enabled on an interconnect.

Certain network data transfers are accomplished by a sequence of posted write requests to stream updates to remote memory followed by a flush request that returns a response when all previous posted writes have reached the endpoint (e.g. destination remote memory). The flush request causes the data written to interfaces by write requests to be flushed from their respective buffers to the remote memory or memories—just as a pipeline can be flushed to clear it before sending new material through. The flush request to data interfaces has an effect somewhat like that of a plunger applied to a pipe such that pushes out everything in front of it in the pipe. By following a stream of posted write requests with a flush request and then waiting for a response to the flush request, a source GPU (e.g. a producer GPU, sender GPU) can ensure that the data it intended to be written is actually written to the remote memory before it notifies other GPUs (e.g. consumer GPUs, receiving GPUs, sink GPUs) that such data is ready to be read. For example, after the source GPU receives a response to the flush request, it can write a flag indicating to the other GPUs (e.g. consumer GPUs) that the written data is now ready to be read.

In some contexts, it is desirable to make this flush operation as precise as possible so as to push out all writes to which the flush was intended without canceling operations that were requested and have not been completed. However, due to the high level of interconnectivity and multiple paths provided in the interconnects of multi-GPU systems, such precise flush operations may require that flush operations are broadcast to every possible path and to every possible endpoint to ensure that no posted writes were missed. For example, when a flush request is received, the interconnect may require that the flush request causes the pushing of all posted writes (PW) and posted atomics (PA) that were previously transmitted to the one or more destinations before the flush response is returned. The transmission of flush requests on multiple possible paths and to multiple endpoints can lead to network "flush storms" of a scale that can adversely impact network performance and also substantially reduce the expected flush synchronization performance. For example, such flush storms can cause congestion in the switch fabric, and lead to lost packets, delayed packets etc. leading to reduced performance of the network synchronization.

Therefore, improved systems and methods are desired to reduce or avoid flush storms in interconnects and to improve multi device synchronization performance.

SUMMARY

Example embodiments rectify deficiencies of the techniques described above for network synchronization.

According to an embodiment a method of synchronizing transactions on a switch fabric is provided. The method comprises receiving one or more posted transactions from at least one source device followed by a flush transaction, transmitting transactions corresponding to the one or more posted transactions received from the at least one source device to at least one sink device over the switch fabric, trapping the received flush transaction at an ingress edge of the switch fabric, monitoring acknowledgments received from the at least one sink device in response to the transmitted one or more transactions, and returning a response to the flush transaction based on the monitoring.

According to another embodiment a communications interconnect is provided. The communications interconnect comprises a plurality of interfaces with each interface being configured to receive and/or transmit transactions from/to one or more processing devices, and flush control circuitry connected to the plurality of interfaces. The flush control circuitry is configured to receive one or more posted transactions followed by a flush transaction, transmit transactions corresponding to the one or more posted transactions, trap the received flush transaction, monitor acknowledgments sent in response to the transmitted one or more transactions, and return a response to the flush transaction based on the monitoring.

DETAILED DESCRIPTION

Figure 1A:
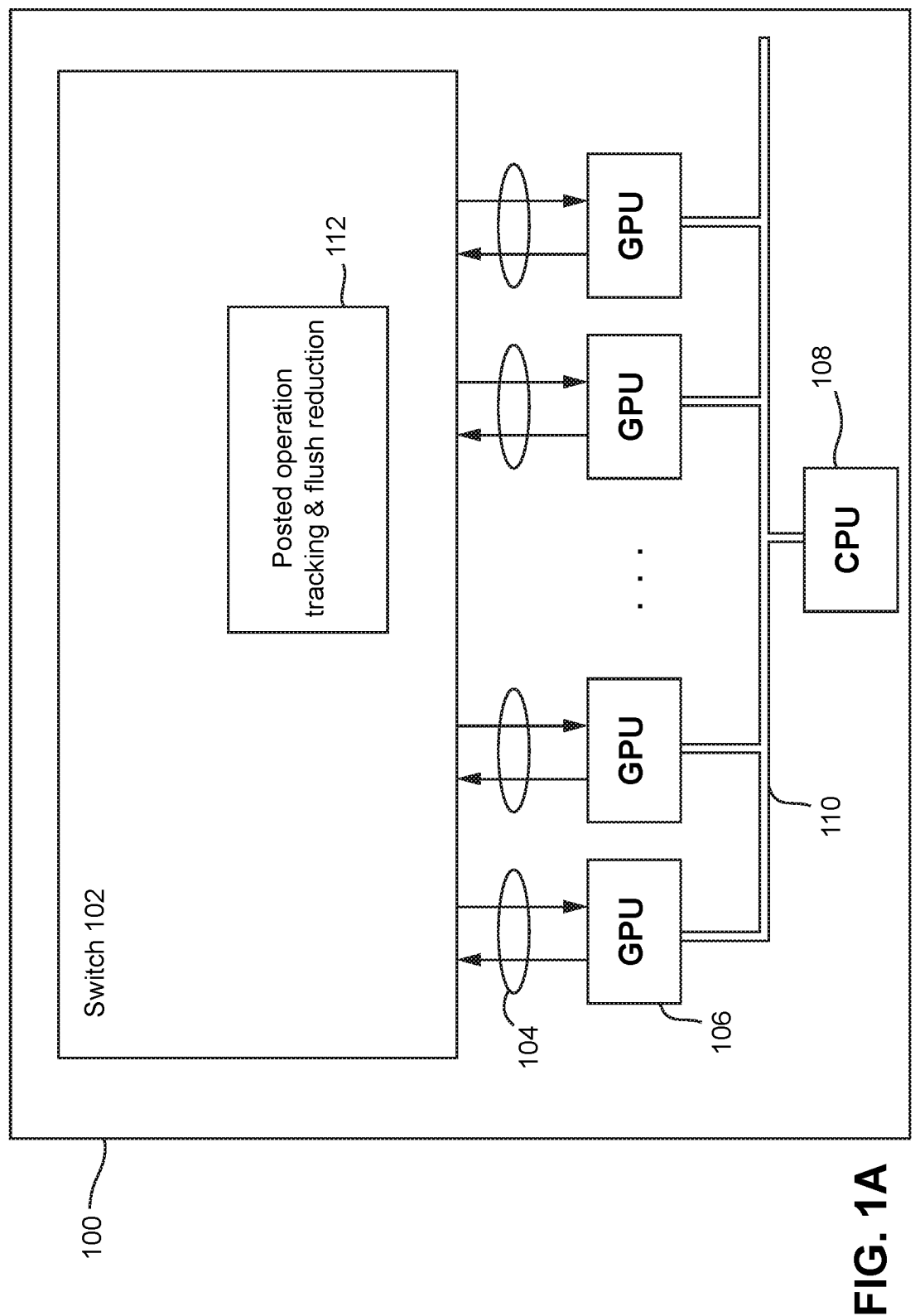
FIG. 1A is a schematic block diagram of a system providing improved network synchronization using flush semantics, according to certain example embodiments.

Certain example embodiments of the present invention provide for more efficient network synchronization of some types of inter-device operations by resolving inefficiencies associated with synchronization techniques currently in use.

For example, some embodiments reduce or avoid the flush storms described above that can be caused in high bandwidth high interconnectivity interconnects such as, but not limited to, NVLINK, in which a device-to-device operation can be output on multiple outgoing links followed by flush operations on multiple possible paths and outgoing links.

Example embodiments of this invention provide a flush mechanism that uses non-posted transaction tracking to reduce or eliminate flush storms in an interconnection network or switch fabric. Incoming flush requests are trapped at the ingress edge of the switch fabric, thus avoiding the network flush storm issues that can occur in the switch fabric. To implement flush semantics, the switch tracks posted transactions (e.g. posted writes, posted atomics) entering the ingress port by converting them to non-posted transactions. Unlike posted transactions, non-posted transactions expect an acknowledge response from the endpoint. Thus, by this conversion, example embodiments utilize the already existing system capability to acknowledge non-posted requests in order to track posted transactions.

In order to associate flush transactions with related posted transactions, posted requests and associated responses are tracked in relation to received flush transactions. The effective time period of a received flush operation is divided into a plurality of flush epochs and a posted transaction count is maintained for respective flush epochs. When the counters indicate that responses for all the converted posted to non-posted transactions have returned for a given flush epoch, the corresponding flush response(s) is/are generated from the switch and sent to the flush requester (e.g. source GPU for the flush request).

By trapping the flush request at the ingress to the switch fabric, example embodiments prevent flush requests from flooding into the network of the interconnects in the fabric and causing congestion that may impact other communicating endpoints unrelated to the sequence of posted transactions giving rise to the flush request. Although the converted non-posted requests may generate additional response traffic in the interconnect network, such responses can be effectively compressed to reduce the additional load imposed. Furthermore, unlike implementations in which the flush requests are sent to every endpoint and every possible path in the network, in example embodiments, the responses to the converted non-posted transactions only flow on links that the corresponding request traversed.

The performance improvements provided by example embodiments enable faster and more efficient device-to-device communication in high bandwidth interconnect environments such as, but not limited to, NVLINK-connected multi-GPU systems. For example, some embodiments provide for fast GPU transfers during halo exchanges from a producer GPU to one or more other GPUs memories. The accurate implementation of flush semantics in example embodiments provide an efficient, network and bandwidth friendly technique by which the producer GPU can advertise data transfer complete to other (e.g. consumer) GPUs in a race free manner.

Systems Using Network Synchronization

FIG. 1A is a schematic block diagram of a system 100 providing improved network synchronization using transaction tracking for flush semantics, according to certain example embodiments. System 100 includes a switch 102 interconnecting a plurality of graphics processing units (GPU) 106. Each GPU 106 connects to the switch 102 by a communication interface 104. The multiple GPUs 106 may be connected via a communication infrastructure such as one or more buses 110 to a central processing unit 108. Although not shown, system 100 may include other components such as memory, other processing units, etc.

The communication interface 104 between each GPU 106 and the switch 102 may include one or more bidirectional links and/or plurality of unidirectional links. Each GPU 106 is configured to communicate bidirectionally with the switch and also other GPUs in system 100. In some example embodiments, the interface 104 comprises NVLINK links. NVLINK provides for multiple GPUs in a single server and yields performance beyond interconnection technologies such as PCI and PCIe. In some embodiments, NVLINK provides full bandwidth communication between GPUs 106. In some example embodiments, the NVLINK interface 104 comprises 6 bidirectional links enabling each GPU 106 to bi-directionally communicate with up to 6 other GPUs over its interface 104.

The switch 102 include posted operation tracking and flush reduction circuitry unit 112 that, in example embodiments, perform the posted transaction remapping and tracking in a manner that is consistent with flush semantics for posted transactions.

The switch 102 comprises a switching fabric which in some example embodiments includes a crossbar type of interconnect capable of interconnecting any ingress NVLINK interface of any of the GPUs 106 to the egress interface of any of the other GPUs 106. According to an embodiment the switching fabric includes an 18×18-port fully connected crossbar on a chip. The crossbar is configured to enable any port to communicate with any other port at full link speed. For example, according to an example embodiment, the crossbar is configured to enable any port to any port communication at full NVLINK speed when the switch ports are connected via NVLINK to the GPUs. The switch 102, however, is not limited to single chip implementations of the switch fabric, to interconnecting devices to the switch by NVLINK, or to crossbar switch fabrics.

Any of the GPUs 106 may receive instructions and data from the CPU 108 via a bus 110. The bus 110 may in some example embodiments include a PCI or PCIe bus. However, bus 110 is not limited to PCI and PCIe. For example, in some embodiments the CPU 108 may be connected to the GPUs 106 by NVLINK.

Each GPU 106 may include a plurality of processing cores. The processing cores may include parallel processing processor units that can run a large number of parallel threads. The processing cores receive and execute instructions from the CPU 108 or other processor in the system 100. Each GPU 106 accesses a local graphics memory via a local graphics memory controller and may also request data from a system memory via the bus 110 and a system memory controller. The system memory may be shared between multiple processing units in the system such as, for example, the CPU 108 and any of the GPU 106. In example embodiments, a processing core on a first one of the GPUs 106 may, in addition to accessing its own local graphics memory and/or system memory, also access the local graphics memory of any of the other GPUs 106 over interface 104 and switch 102. The interface 104, as noted above, is a highspeed low latency interface that enables GPUs 106 to access the resources of each other such as, for example, the memory of each other and/or the processing resources of each other. In an example embodiment, interface 104 may implement an address translation service providing a flat address space enabling the GPUs 106 and CPU 108 to access each other's memory to perform direct loads and stores in a flat address space.

Figure 1B:
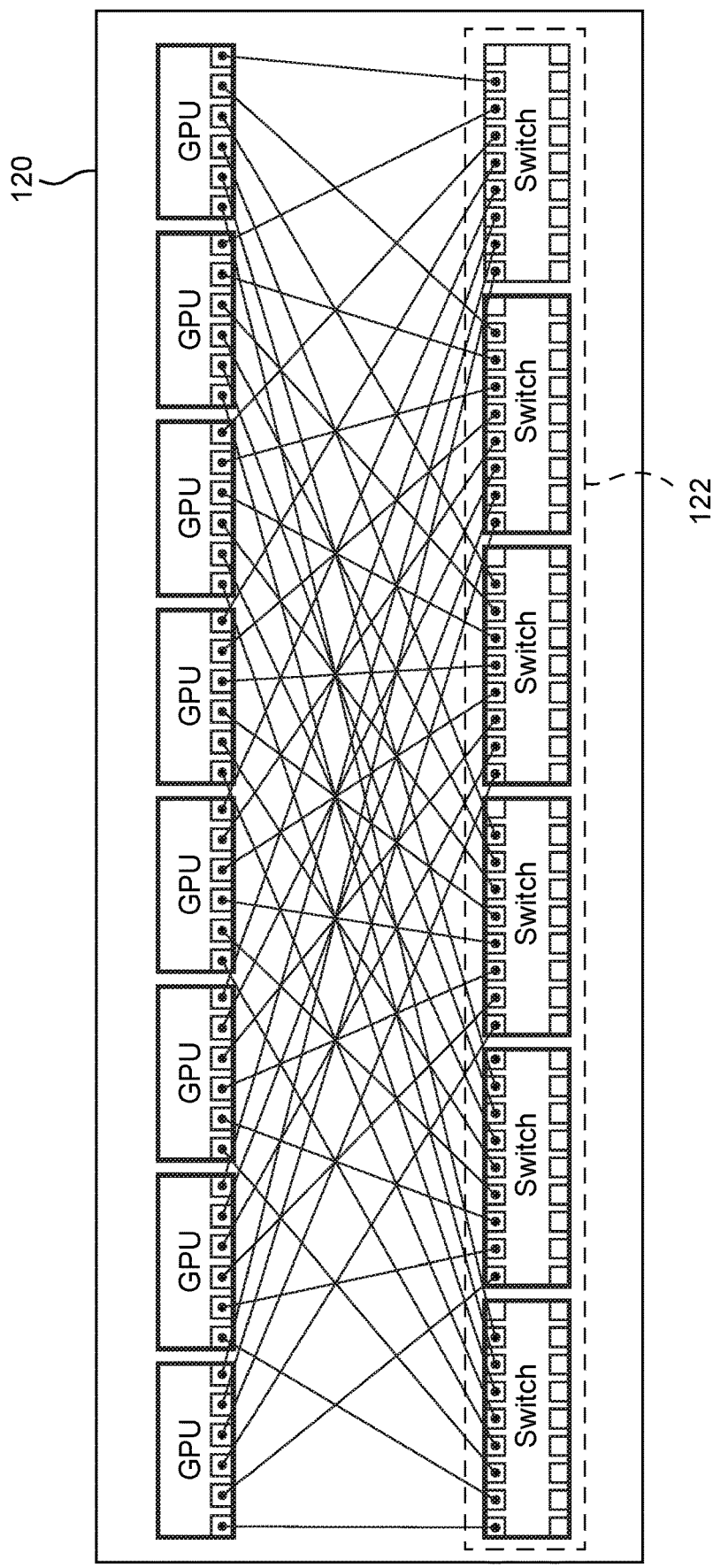
FIG. 1B schematically illustrates an example System-on-Chip (SoC) including multiple GPUs and multiple switches, according to certain example embodiments.

FIG. 1B illustrates an example embodiment in which an SoC 120 includes multiple GPUs that are connected to each other via a group of switches 122. Each of the switches in the group 122 may correspond to switch 102 shown in FIG. 1A and includes posted operation tracking and flush reduction unit 112. In SoC 120, each GPU is connected to each of the switches in the group of switches 122 over a separate bidirectional link. According to the illustrated embodiment, in each GPU of the SoC 120, each of the 6 ports of that GPU connects to a different one of the switches in group 122 over a separate bidirectional link such as, for example, an NVLINK link. Correspondingly, in each switch of group 122, each of the 6 GPUs is connected to a respective one of the 16 ports on the switch.

In some example embodiments, the capability provided for each GPU in the system to connect with each other GPU via multiple ports enables a source GPU to transmit respective posted writes of a group of posted writes over different ports, which in turn requires the flush request corresponding to that group of posted requests to also be transmitted out of those multiple ports.

According to an embodiment, an instance of the posted operation tracking and flush reduction unit 112 may be configured on each of the ports on a switch. In another embodiment, a switch may have a single instance of the unit 112 connected to all its ports. The unit 112 operates to, among other aspects, reduce the number of flush requests that are forwarded from the ports to the switch fabric, thereby reducing or eliminating flush storms described above.

Figure 1C:
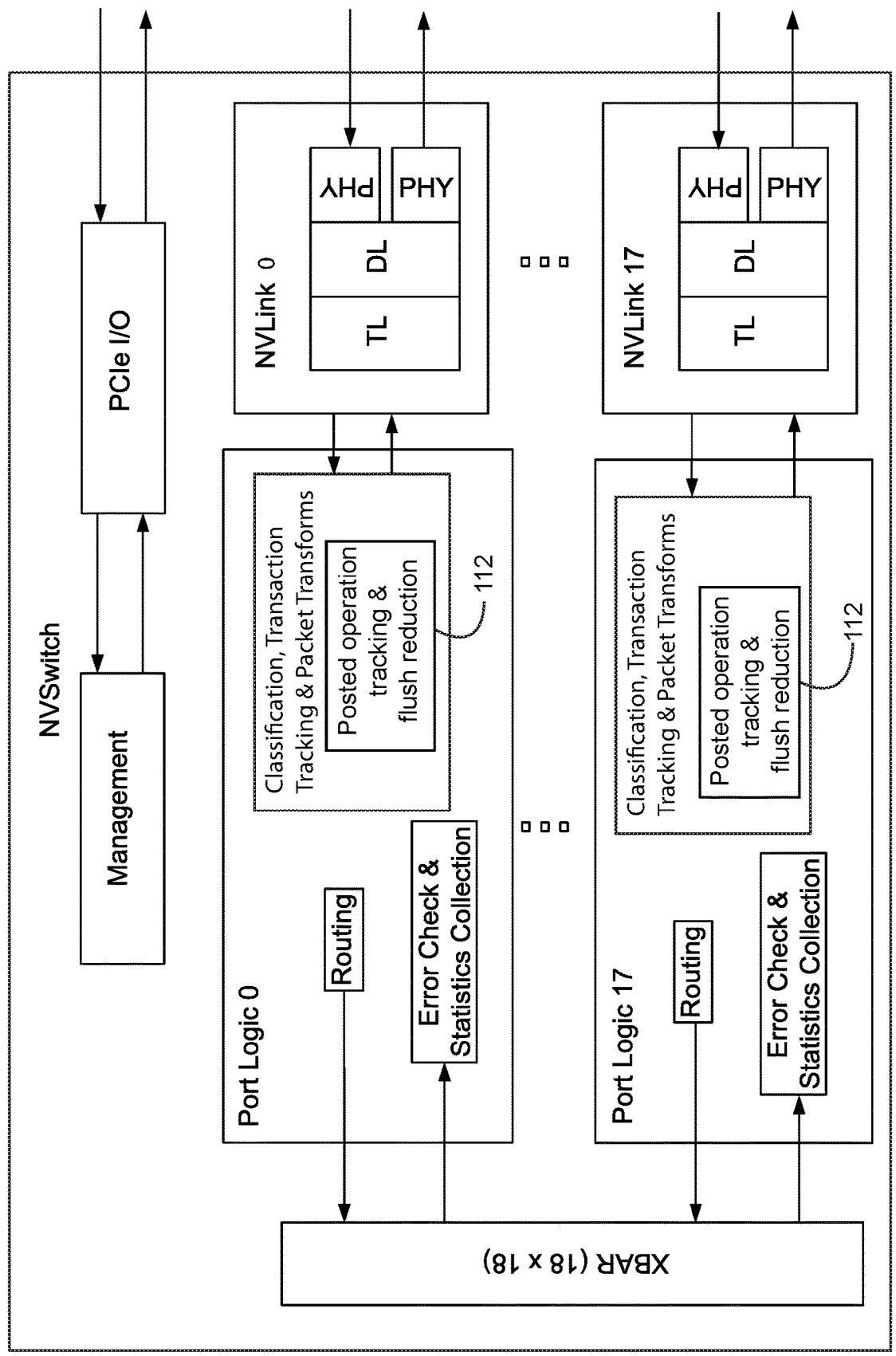
FIG. 1C is a block diagram schematically illustrating certain components of an example switch, according to some example embodiments.

FIG. 1C is a block diagram conceptually illustrating certain components of an example switch, according to some example embodiments. As shown in FIG. 1C, the example switch includes routing, error check and statics collection, classification, transaction tracking and packet transform functions that are being implemented in the logic for each port of the switch between the NVLINK interface (e.g. "NVLINK 0") and the switch fabric ("XBAR (18×18)"). According to certain example embodiments, an instance of the posted operation and flush reduction unit 112 is also implemented in the logic for each port of the switch in order to provide capabilities such as the capability to reduce or eliminate flush storms that could be caused if the flush requests were forwarded to the switch fabric.

Figure 2:
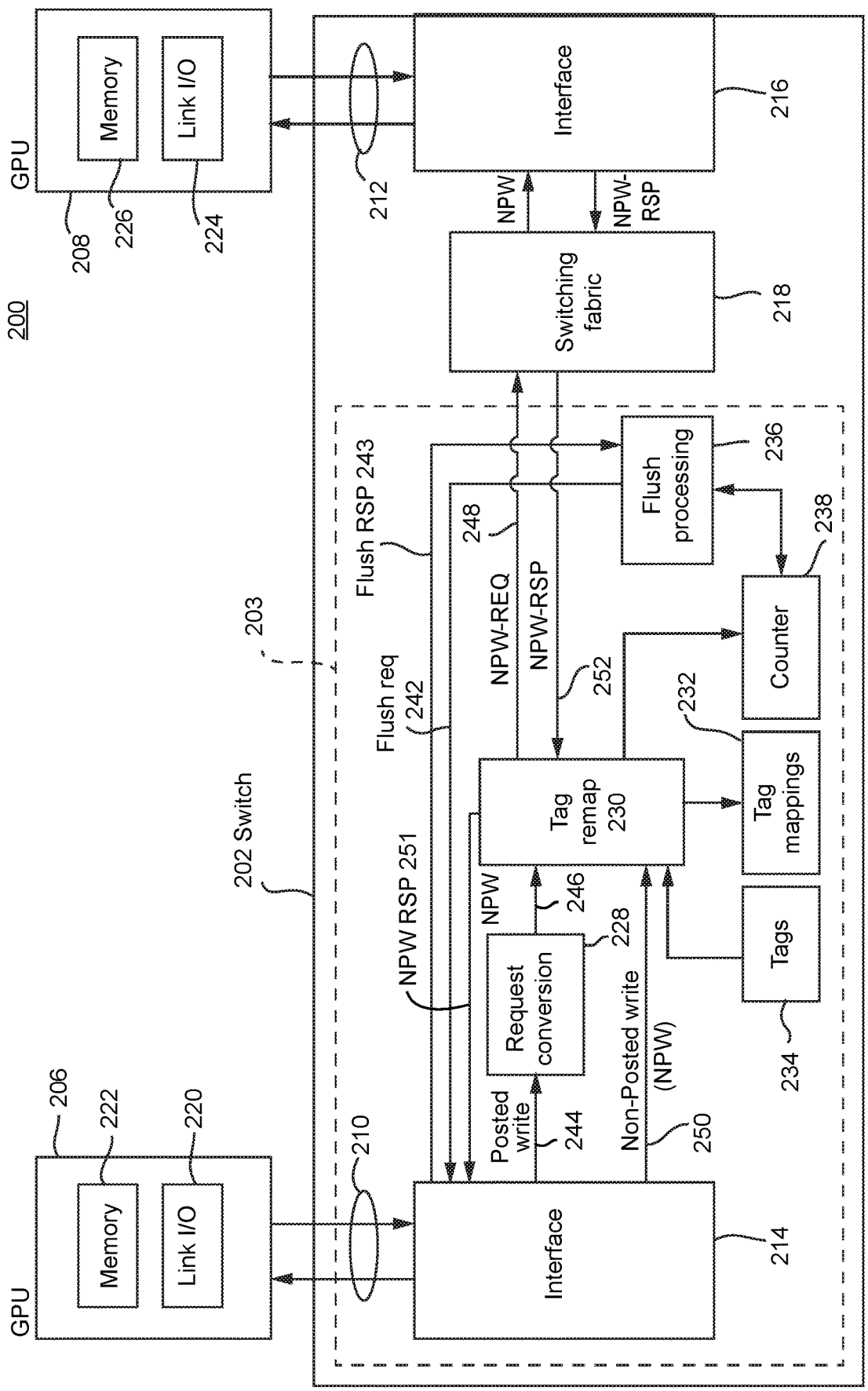
FIG. 2 is a schematic block diagram of a system like that shown in FIG. 1 showing more details of the network switch, according to certain example embodiments.

FIG. 2 is a schematic block diagram of a system such as that shown in FIG. 1A showing more details of the network switch, according to certain example embodiments. The illustrated system 200 may correspond, for example, to a part of system 100 comprising two GPUs 106 and the switch 102. Switch 202 in FIG. 2 may correspond to switch 102 in FIG. 1A.

In the illustrated system 200, GPU 206 and GPU 208 are configured to communicate with each other via a switch 202. The GPUs 206 and 208 connect to the switch via interfaces 210 and 212, respectively. Each of the interfaces 210 and 212 may be, but is not limited to be, an NVLINK interface.

Link I/O modules 220 and 224, located in GPUs 206 and 208 respectively, may include circuitry and/or software implemented logic for providing the capability for GPUs 206 and 208 to access the memories 222 and 226 of each other. For example, in certain example embodiments, GPU 206 may read from, and may write to memory 226 that is located in GPU 208 using the logic 220 and by communication over the switch 202 to which it connects by interface 210.

In example embodiments, the GPU 206 may utilize either or both of two types of operations, posted write or non-posted read/write, to use the memory 226 in the GPU 208. According to some example embodiments, memory writes and inter-GPU messages are implemented as posted operations, and memory reads, memory read locks, I/O reads, I/O writes, configuration reads and configuration writes are implemented as non-posted operations.

As noted above, non-posted operations require an acknowledgement for each operation. For example, the link I/O module 224 or another logic component in the destination endpoint GPU 208 is configured to generate an acknowledgement for each non-posted read request received at GPU 208. In some embodiments, acknowledgment returned to the requester (e.g. source GPU) in response to a non-posted read request may be the data itself or a part thereof. In some embodiments, a separate acknowledgement code may be included with the data being returned or may be sent separately to the requester. If the non-posted read request results in an error, then an error code is returned to the requester. For non-posted write requests, the destination endpoint returns an acknowledgment message when the write is completed. As with non-posted read requests, an error code may be returned by the destination endpoint GPU if the write results in an error.

In contrast to non-posted operations in which the requester (e.g. source or source endpoint) expects an acknowledgement and/or response to each request, the requester does not expect acknowledgements for respective posted operations. In some embodiments, if a posted write request results in an error, the endpoint may generate an error code that is returned.

GPU 206 may use posted write requests, for example, to quickly issue multiple write requests for respective blocks of memory. Instead of requiring each posted operation to return an acknowledgement, the sequence of posted operations in example embodiments is followed by a flush request. According to the semantics of the flush operation, the flush request causes the interconnection to output the respective multiple posted requests (e.g. flush the intermediate or network and interface buffers holding the requests) to the endpoint(s) (e.g. memory) on the destination GPU(s). According to the semantics of the flush operation, a flush response (i.e. a response to a flush request) is generated to indicate the completion of a flush at each destination. In embodiments of the present invention, flush requests are not forwarded to the destination endpoints and are instead trapped before they can enter the switch fabric to be forwarded to the destination. In some example embodiments, a flush response for a particular flush request may be generated in the posted operation tracking and flush reduction unit 112 associated with the switch port connected to the GPU that originates the flush request.

FIG. 2 illustrates example logic 203 in switch 202 that is activated in response to posted write requests received from GPU 206. The logic 203 implements the functionality described in relation to posted operation tracking and flush reduction logic 112. According to an embodiment, a separate instance of logic 203 is associated with each port of the switch 202. In FIG. 2, only the instance of logic 203 that is associated with the ingress of posted requests is shown. More specifically, only the instance of logic 203 that is associated with port 214 which is connected to GPU 206 that originates the posted requests in the described scenario is shown in FIG. 2. It will be understood, however, that respective instances of logic 203 may be associated with each of the ports that connects to a GPU.

Port 214 and port 216 of the switch 202 are connected to GPU 206 and GPU 208, respectively via interfaces 210 and 212. According to some embodiments, the interfaces 210 and 212 are NVLINK links. Port 214 and port 216 represent the ingress interface and an egress interface in the switch 202 with respect to the posted write requests received from GPU 206.

The posted write requests may be directed to write some data from the memory 222 and/or registers of GPU 206 to the memory 226 in GPU 208. The generation and transmission of the posted write requests may be performed by the link I/O module 220 and/or another module in GPU 206. At the GPU 208, incoming posted or non-posted write requests may be processed by link I/O module 224.

As described above, embodiments are configured to reduce or eliminate flush storms resulting from posted transactions. This is achieved in example embodiments by converting incoming posted requests to corresponding non-posted requests, and implementing a mechanism that mimics the flush semantics expected by the requester that transmits the flush request.

In the example embodiment illustrated in FIG. 2, an incoming posted write request 244 is converted to a corresponding non-posted write request 246 by request conversion unit 228.

A tag remapping unit 230 replaces the tag of the requests with an internally generated tracking tag. The tag remapping is performed for converted non-posted write requests 246 and also for original (i.e. not converted) non-posted write requests 250. The non-posted write requests with the tracking tags 248 are transmitted to the switch fabric 218 to be sent to GPU 208 via port 216. In some embodiments, however, the tag of incoming posted requests may not be remapped and instead another technique (e.g. such as a marking a particular bit) for identifying converted requests can be employed.

The tag remapping unit 230 obtains the tracking tags from a tag collection 234. The tag collection 234 includes a plurality of internally generated and maintained tags. The tag collection, in some example embodiments, may be maintained as a first-in-first-out (FIFO) queue from which tags are obtained for remapping write requests and to which tags from received responses to write requests are added. The FIFO may be configured to hold tags for a predetermined maximum number of pending requests that are remapped. The switch may buffer incoming requests when the FIFO runs out of tags to be used by the remapping unit 230.

The mappings between the original tag and the tracking tag for all pending requests is maintained in a table of tag mappings 232. For each pair of original tag and tracking tag, the table 232 maintains several other parameters. For each pair of original and tracking tags, the table 232 also keeps track of the associated flush request. The table may be accessed based on the tracking tag.

When a response 252 for a non-posted write request 242 is received for the remapped request 248, the response includes the tracking tag. The tag remapping unit 230 may also be responsible for tracking the responses received for each transmitted request with a tracking tag. For originally received non-posted write requests (i.e. the non-converted posted write requests), the tag remapping unit 230 replaces the tracking tag in each response with the corresponding original tag before forwarding the response 251 back to the requester. The tag mapping table 232 can be accessed based on the tracking tag in the received response. The tracking tag from the received response is added to the tag collection 234.

Unlike in the case of originally received non-posted requests, since the converted non-posted requests were originally in posted request form, for which the requester does not expect a response, the tag remapping unit 230 does not generate corresponding responses to send back to the requester. In response to receiving each response to a converted non-posted request, the tag remapping unit 230 updates the tag mappings table 232 and counters 238. Moreover, the tracking tag received with the response is added back to the available tag collection 234.

As noted above, the flush semantics associated with posted requests may cause a flush request to be transmitted from GPU 206 to the switch. A flush processing unit 236 operates to trap the incoming flush request 242 before the request enters the switch fabric 218.

In some embodiments, the switch fabric 218 is a crossbar. However, embodiments are not limited to particular types of switch fabric. For example, the switch fabric 218 may provide each of a plurality of GPUs or other processors to connect to the fabric by one or more interfaces and may include an interconnection network of any topology such as, but not limited to, tree, 2D/3D mesh, torus, dragonfly etc., that can interconnect the plurality of GPUs or other processors.

The flush processing unit 236 receives the flush request 242 and accordingly updates a state machine (not separately shown in FIG. 2) associated with the counters 238. The state machine and counters 238 are updated in response to responses received from the destination endpoint for the requests (e. g. GPU 208). More specifically, each response causes the counters 238 to be updated, which in turn is monitored by the state machine associated with the flush processing unit 236. When responses for all the requests associated with a particular flush request has been received, the flush processing unit 236 (or other component in 203) generates a flush response 243 and returns to the requester (GPU 206) via port 214.

Figure 3:
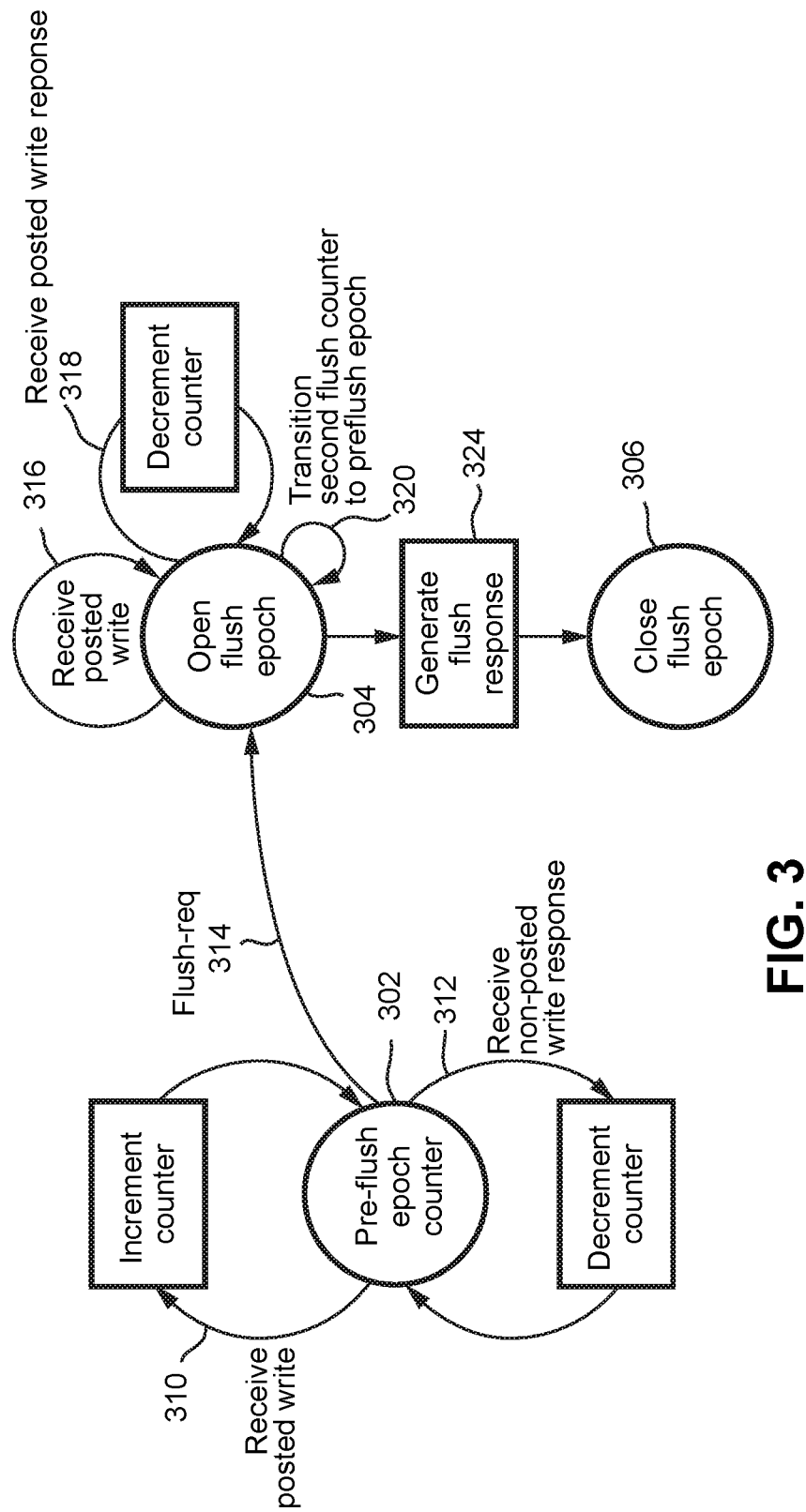
FIG. 3 is a state diagram of the flush operation state machine in the systems of FIGS. 1 and 2, according to certain example embodiments.

FIG. 3 is a state diagram of the flush operation state machine in the systems of FIGS. 1A-1C and 2, according to certain example embodiments.

The state machine 300 includes three states: a pre-flush epoch state 302, an open flush epoch state 304 and a close flush epoch state 306. The state machine, in an example embodiment, may be implemented using two counters, a primary flush counter and a secondary flush counter, with each being capable of transitioning between states 302, 304 and 306. Each counter may be initialized to state 302. The illustrated state machine 300 applied to the counter that is operating as the primary flush counter.

When the primary flush counter is in the pre-flush epoch state 302, the counter is incremented for each received posted write 310, and is decremented for each received response 312 for converted non-posted writes. When a flush request 314 is received, the state machine for the primary flush counter transitions from the pre-flush epoch state 302 to the open flush epoch state 304, and the secondary flush counter is engaged 320 in the pre-flush epoch state.

While in the open flush epoch state 304, the primary flush counter is decremented for each received posted write response 318. However, the primary flush counter is not incremented for each received posted write 318 while in the open flush epoch state 304. While the primary counter is in the open flush epoch state, the secondary flush counter is in the pre-flush epoch state and keeps track of all new incoming posted writes and also all new incoming flush requests.

When the primary flush counter which is in the open flush epoch state reaches 0, it is considered as an indication that at least all the posted requests that preceded the flush request corresponding to the one or more flush requests associated with the primary flush counter have received corresponding responses, and a flush response is generated 324 and transmitted to the requester. The state machine for the primary flush counter transitions to the close flush epoch state 306.

When the primary flush counter transitions to the close flush epoch state, the secondary flush counter transitions to become the new primary flush counter and the old primary flush counter becomes the new secondary flush counter. The new primary flush counter then begins operating in accordance with the state machine 300.

The state machine 300 is described in more detail below in association with the circuitry shown in FIGS. 4 and 5. As described below in more detail in relation to FIGS. 4-5, a mapping table enables associating each received response to a non-posted operation to a flush request, so that the counting for the state machine 300 can be accurately performed.

Figure 4:
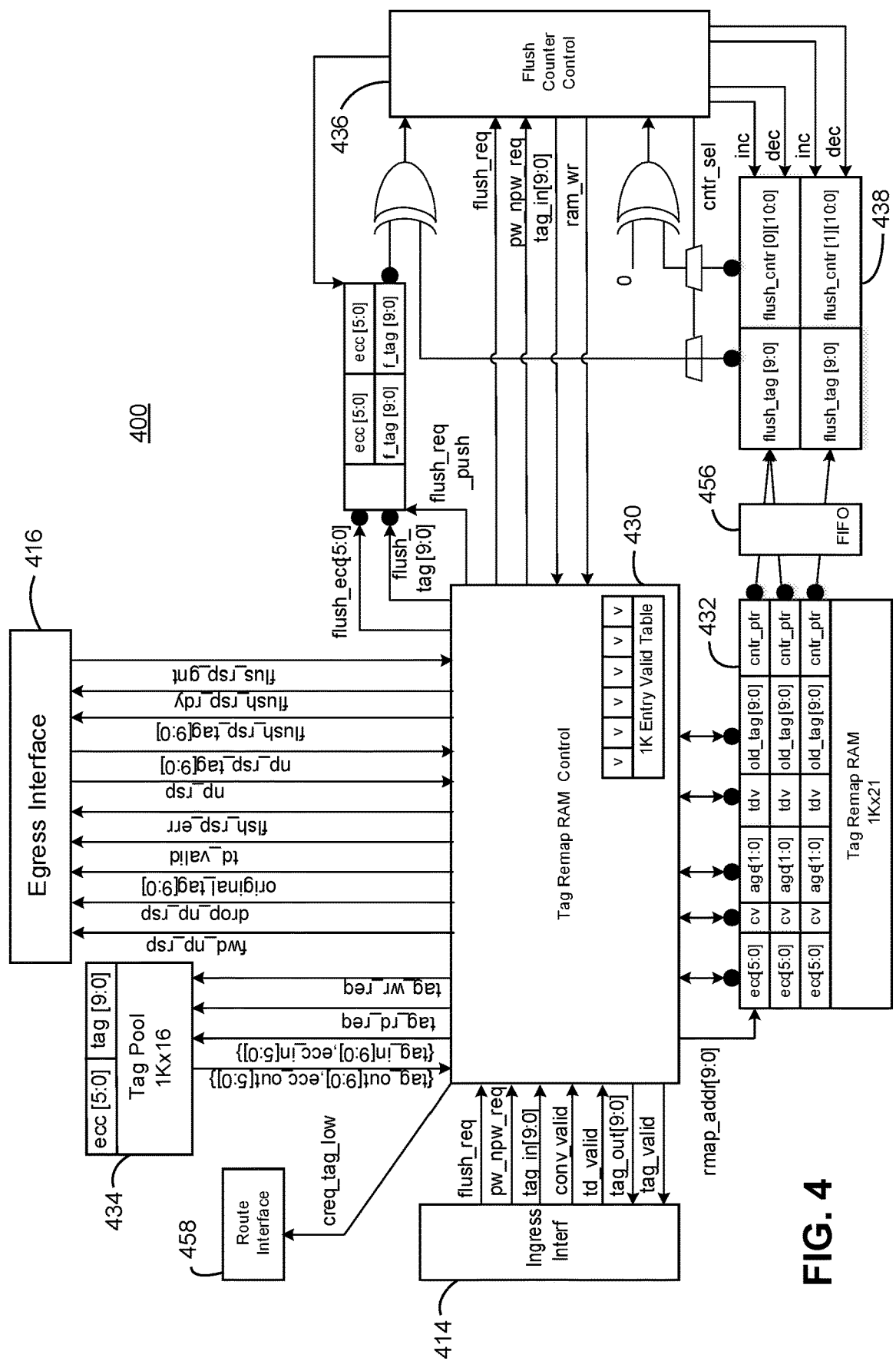
FIG. 4 schematically illustrates the tag remapping and flush operation control circuitry according to some example embodiments.
Figure 5:
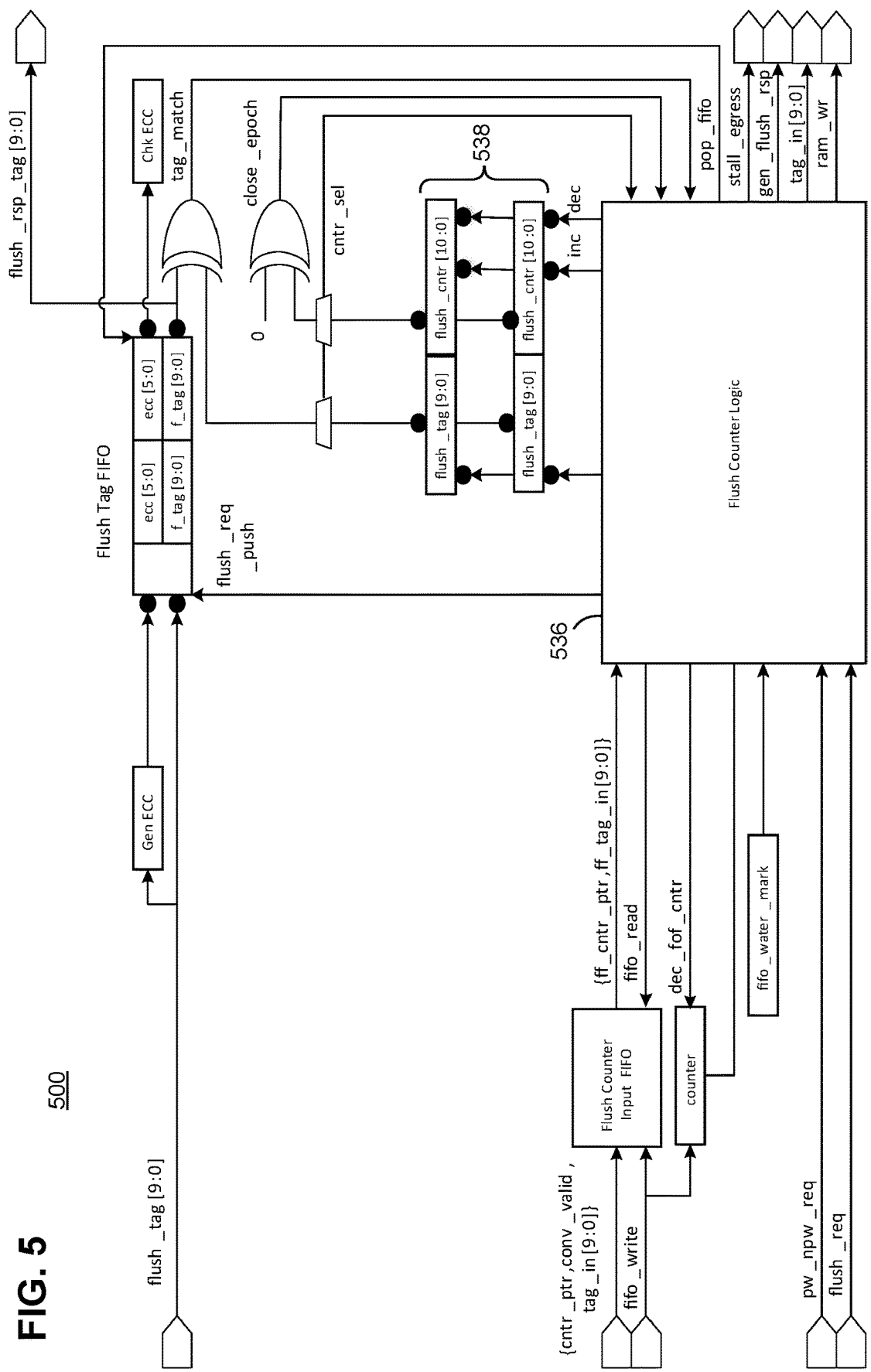
FIG. 5 schematically illustrates example flush control circuitry, according to some example embodiments.

FIG. 4 schematically illustrates the tag remapping and flush operation control circuitry according to some example embodiments. The circuit 400 may schematically illustrate an implementation of the port logic 203 described in relation to FIG. 2, in an example implementation.

The ingress interface 414 and the egress interface 416 connect the port circuitry 400 to a source GPU, such as GPU 206, which originates posted write requests and non-posted write requests directed to a memory in a destination GPU, such as GPU 208.

When a posted request is detected by the Tag RAM control block 430, the request has its tag replaced and state stored in a Tag Remap RAM 432. In addition the command type of the request is converted to a non-posted command before forwarding the packet to the route block 458. Tag substitution is necessary because the original tag of the posted request can collide with a tag of a previously generated endpoint non-posted request, or a newly arriving non-posted request from the endpoint could collide with a tracked non-posted operation. To eliminate the possibility of collisions in example embodiments, both posted and non-posted commands arriving from the endpoint will have their tags substituted.

The tag remap RAM control unit 430 is configured to perform the conversion of incoming posted write requests (pw_req) and tag replacement of the incoming posted write requests and non-posted write requests (npw_req). As described above, example embodiments require that posted requests are converted to corresponding non-posted requests before being routed to the destination. As also described above, example embodiments remap the original tags of received posted requests and non-posted requests with tracking tags before they are routed to the respective destinations.

A tag remap RAM 432 stores the tag mappings for all pending requests for which tag remapping has been performed. According to an embodiment, the tag remap RAM 432 comprises a mappings table that includes mappings for all pending non-posted requests. includes an age field. In an example embodiment, the tag remap RAM may include a maximum of 1024 entries.

The mappings table may include an age field, which may be monitored to detect any mapping that exceeds a predetermined age threshold without receiving a corresponding response. Such mappings with an age that exceeds the threshold age may be removed from the mappings table, and their information may be provided to software so that corrective action can be taken. The age field thus provides for a timeout mechanism that can be used to detect packets that are lost in the fabric, and/or requests for which the destination fails to provide a response. The Tag Remap RAM 432 may also contain information (e.g. valid bit (cv)) indicating if the remapped tag belongs to an endpoint generated posted operation or a switch converted posted operation. It may also store the transaction done valid bit (tdv) for later use by egress processing.

Each mapping in the table 432 may also include a counter pointer which associate the mapping with one of the flush counters in a state machine 438. The determination as to which flush counter is associated with an incoming response to a non-posted request can be made based on the counter pointer in the corresponding mapping.

A tag pool 434 is a list of tags available to be used in the remapping. According to an embodiment, the tag pool 434 consists of 1024 integers from 0-1023 that are to be used as tracking tags on incoming requests. The pool can be implemented as a FIFO from which a tracking tag is popped for each incoming request that required remapping, and to which a tracking tag recovered from a received response is pushed. It should be noted that, during operation of the system over time, the FIFO may contain the tracking tags in any order because the responses may be received out of any particular ordering.

After the conversion and remapping in the tag remap RAM control 430, a route interface 458 is used to select the egress interfaces to which the converted non-posted write requests are to be sent.

Incoming flush requests (flush_req) are forwarded to flush counter control 436. The incoming flush requests are also input to a FIFO queue 456.

The state machine 438, in some embodiments, comprises two counters (flush_cntr[0], flush_cntr[1]) which is updated by the flush counter control 436 in response to write requests, write responses and flush requests. In some embodiments, the two counters may also be updated in accordance with requests and responses associated with atomic operations. The two counters in the state machine may be formed as a ping-pong structure, where the two counters operate in particular states of the state machine at different times as described in relation to FIG. 3 above. In some embodiments, the counter corresponding to the current open flush epoch may be kept in a register, and the counter corresponding to the pre-flush epoch may be maintained in a table in RAM, or vice versa. In other embodiments, both counters may be in registers, and in yet other embodiments both may be in RAM.

Certain high bandwidth interconnect endpoints, such as, but without limitation, NVLINK connections, can have multiple outstanding flush requests on a particular link. To provide the correct flush semantics the switch in example embodiments supports arbitrary interleaving of flush and posted write requests. A mechanism used in some embodiments is to have a small number of flush counters (2) where each flush counter is used to count the number of outstanding converted posted operations between flush commands. In certain example embodiments, the switch hardware is configured to rely on a special property of flush semantics because the number of flush counters is much less than the total number of possible outstanding flushes (e.g. up to 1024). While flushes are prohibited from passing posted writes, the inverse relation, posted writes passing flushes, is allowed according to the flush semantics of various interconnect technologies. This property is used in certain embodiments to allow fewer flush counters (e.g. fewer than the number of flush requests pending at a time) to be used in tracking. This solution substantially simplifies the tracking hardware, however, at the expense of somewhat less precise flush to posted write tracking.

If there are only 2 outstanding flushes at a given time, then the mechanism with two flush counters for the tracking in state machine 438 is accurate. In this scenario, the flush responses generated are precisely associated with earlier posted write operations. If the number of outstanding flushes goes beyond 2 then the most recent flush epoch tracking counter (e.g. the secondary flush counter described in relation to FIG. 3) accumulates converted non-posted write tracking counts for all following flushes. This accumulation of flush responses (e.g. flush responses to be subsequently generated) against a single counter continues until the flush hardware catches up and goes back to a situation where 2 or less outstanding flushes are being tracked.

Assuming that at time zero a number of posted operations arrive at the ingress port 414, in the pre-flush epoch state, the primary flush counter increments with each posted request as it arrives and is decremented (e.g. by egress) as each converted non-posted response is returned. A pre-flush epoch state refers to the case where the counter is still being incremented by arriving posted operations. An open flush epoch state refers to the case where the primary flush counter is only decremented by processing returned converted non-posted operations. A closed flush epoch state refers to when the final tracked converted non-posted response returns, the primary flush counter is decremented to 0, the counter is retired and the corresponding flush response is generated.

When a flush request is received, the current primary flush counter which is in the pre-flush epoch state transitions to the open flush epoch state while the secondary flush counter is transitioned to pre-flush epoch state. In addition, the flush tag is pushed into a FIFO 456 and the tag is also saved in a register (e.g. flush_tag[ ] registers in 438) associated with the counter. If no other flushes arrive while in this state the counter in the open flush epoch state will eventually transition to the closed state as it processes the returned responses. However, if while in this state another flush arrives, the current pre-flush epoch state counter (that is, the secondary flush counter) remains in pre-flush epoch mode. If this happens the new flush tag is again pushed into the FIFO 456 and the flush tag associated with this pre-flush epoch counter is also updated with this flush tag.

If yet another flush arrives, the same behavior is repeated. The flush tag is pushed to the FIFO 456, the counter is left in pre-flush epoch mode and its flush tag register is updated with the new tag. This process continues until the open flush counter is eventually closed. When the open counter is finally decremented to 0, the flush tag FIFO 456 is popped until the popped tag value and the flush tag which is stored in its local register (e.g. one of two flush_tag[ ] registers in 438) and is associated with the counter in the closed flush state are equal. In this example, the match occurs with the entry at the head of the FIFO so only one entry is popped. This pop also causes the forwarding of a flush response request to the egress blocks 416. At this point the closed flush epoch counter is now available to start tracking the current pre-flush epoch. When this happens the current pre-flush epoch counter, which is tracking multiple outstanding flushes, is transitioned to the open flush epoch state.

In this new state the new pre-flush epoch counter now increments on every new posted operation while the other counter, now in the open flush epoch state only, decrements on returned posted operations. When this counter is decremented to 0, flush counter control 436 begins popping entries from the flush tag FIFO and returning a response for each one popped. This continues until the popped flush tag entry matches the flush tag in the associated counter flush tag registers.

When egress processes a response it first does a lookup on the tag remap table 432 using the tracking tag from the response as the index into the table. The value retrieved from this lookup contains a pointer to the associated flush counter in counters 438. As this table 432 can be simultaneously written by ingress (e.g. 414) and read by egress (e.g. 416) the RAM is preferably dual ported. Furthermore, since egress can write the RAM at the same time as ingress there may be a possible write collision hazard that should be avoided. Embodiments may preferably grant ingress write priority. This implies that egress should be configured to be capable of delaying the write operation. To avoid loss of information the egress may support a write FIFO with the ability to stall the egress pipeline if necessary FIG. 5 schematically illustrates example flush control circuitry, according to some example embodiments. The circuitry 500 represents an implementation of the flush counter control 436 and associated flush response generation logic according to an embodiment.

The flush counter control logic 536 updates state machine counters 538 in response to received posted requests, flush request and responses to converted non-posted requests. In some embodiments, flush counter control logic 536 and state machine counters 538 correspond to implementations of flush counter control logic 436 and state machine counters 438 described in relation to FIG. 4.

A stream of flush counter (flush_cnt) values are streamed into a spill FIFO 540 to allow flush counter control 536 time to back pressure if contention on the RAM resources limits updates. When the counter 540 is popped the counter logic sequences a decrement and a comparison of the counter against 0 (e.g. look ahead is possible here, if helpful) and, if valid, may sequence a flush tag pop and comparison loop. Note that because the FIFO 540 is located between the tag remap FIFO (e.g. table 432) and the flush counter FIFO (e.g. FIFO 456) the processing of the flush counters is delayed. The flush counter FIFO 456 enables correct handling of acknowledgements received for transmitted non-posted requests even if they are received out of order, by allowing multiple pending flush requests to be associated with the last received flush request.

Figure 6A:
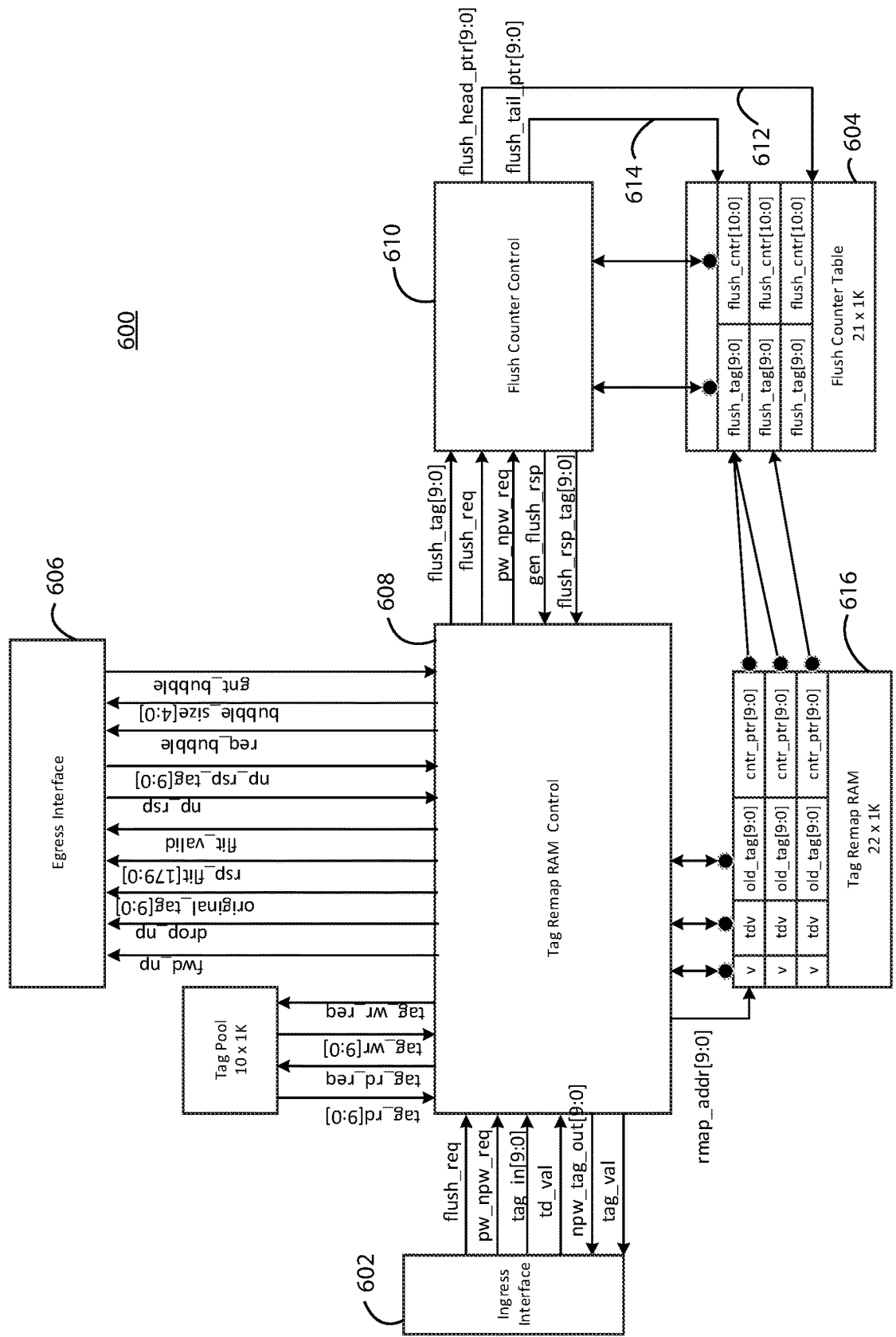
FIG. 6A schematically illustrates another implementation of the tag remapping and flush operation control circuitry according to some example embodiments.
Figure 6B:
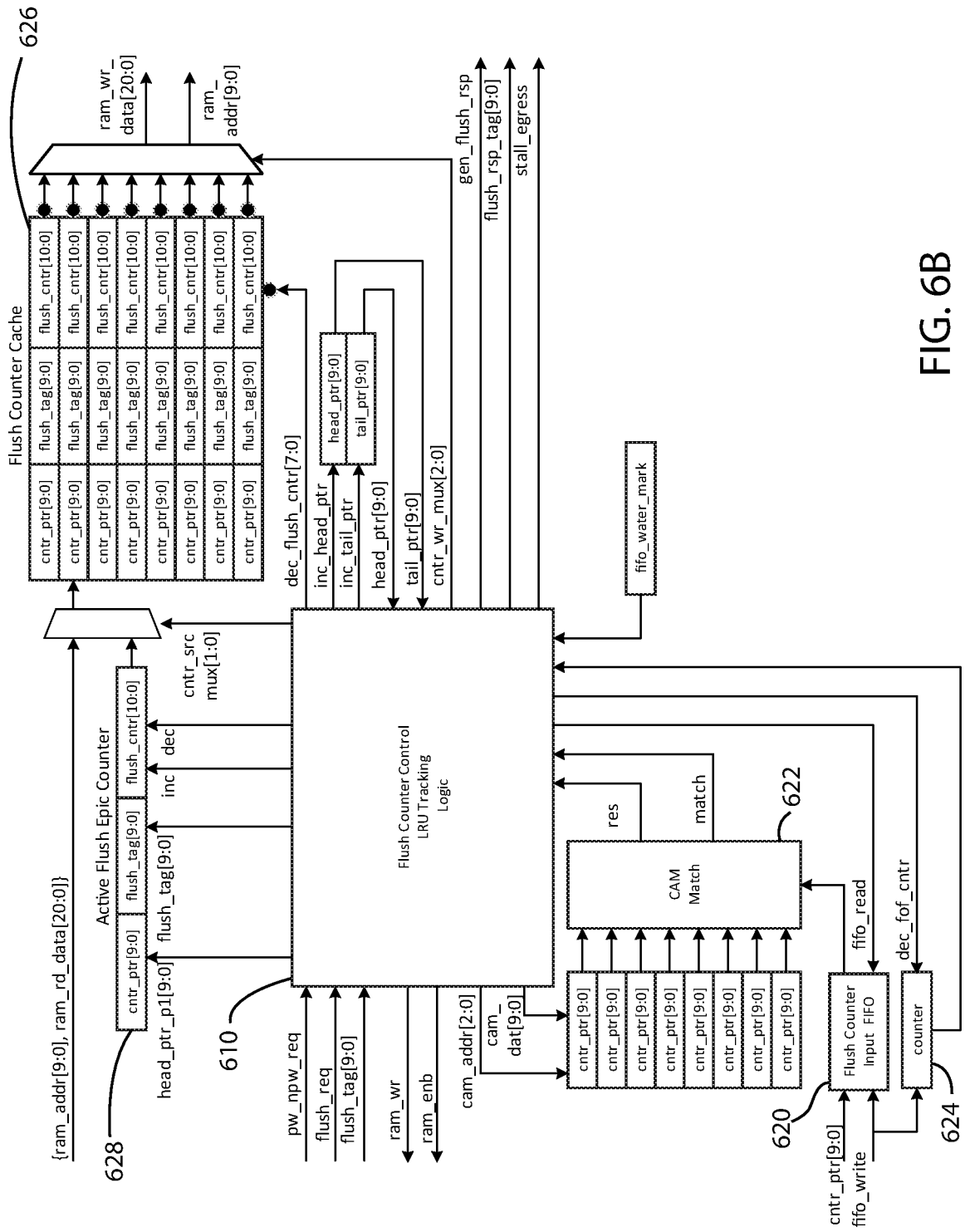
FIG. 6B schematically illustrates another implementation of the flush control circuitry, according to some example embodiments.
Figure 6C:
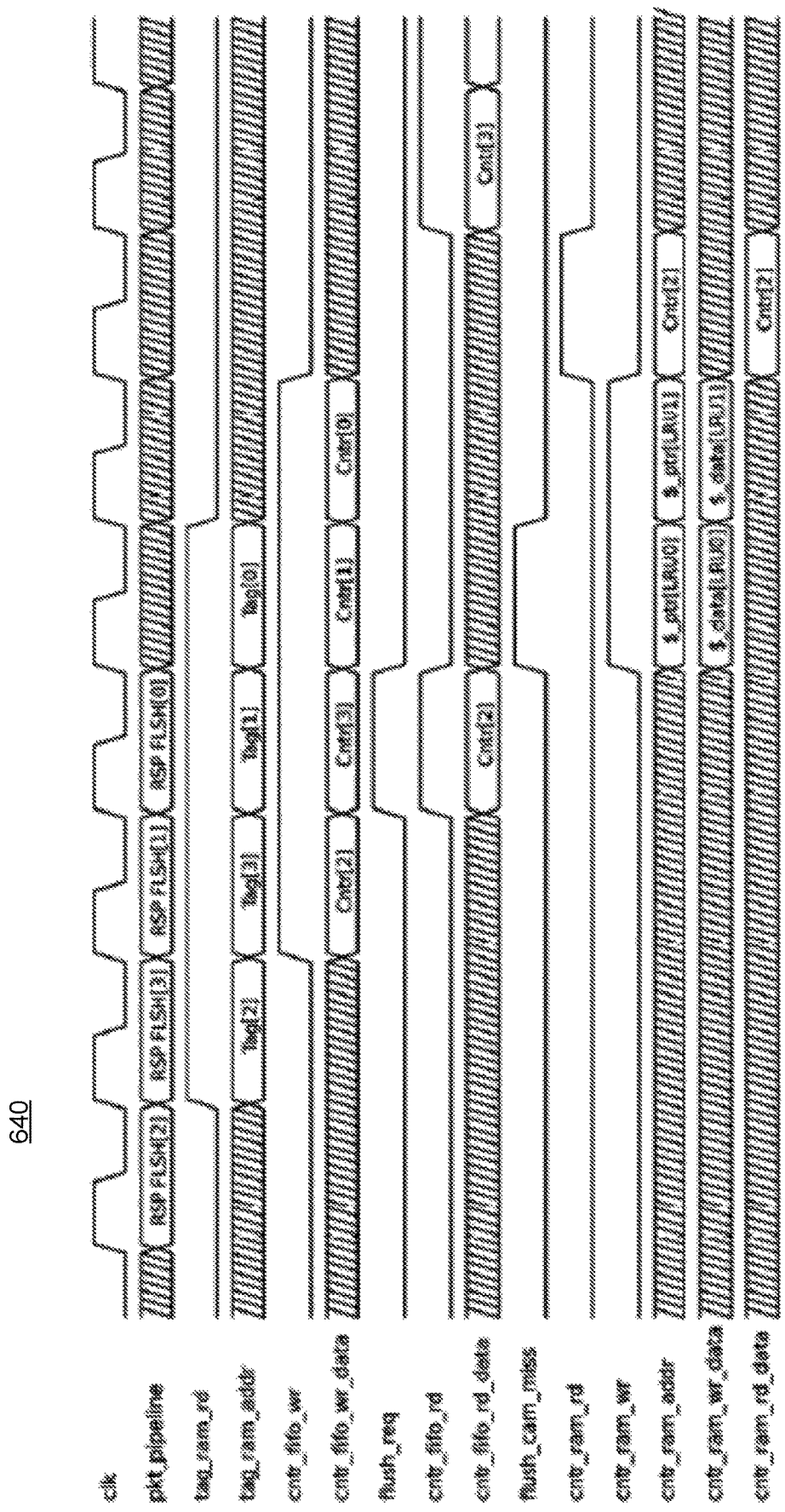
FIG. 6C schematically illustrates a timing diagram showing certain example operations, according to some example embodiments.

It should be noted that although the embodiment illustrated in FIG. 4 uses two counters, example embodiments are not limited to having only two counters. FIG. 6 (FIGS. 6A-C) for example, illustrates embodiments having more than two counters. FIG. 6A schematically illustrates another implementation of the tag remapping and flush operation control circuitry, such as that described in relation to FIG. 4, according to some example embodiments.

In contrast to the very small number (e.g. 2) of flush counters configured in circuit 400, according to another embodiment circuit 600 may have a series of flush counters (e.g. a respective counter for each outstanding flush request up to 1024) where each flush counter is used to count the number of outstanding converted posted requests between flush requests. If at time zero a number of posted requests arrive on the ingress port 602, the active flush epoch counter (e.g. in flush counter table 604 or separately from table 604 such as in active counter 628 shown in FIG. 6B) increments with each posted request as it arrives and is decremented by egress 606 as each corresponding non-posted response is returned. When a flush arrives, a new flush epoch is started. The current flush epoch is saved. In some embodiments, the current flush epoch is saved in a spare slot in the flush cache (e.g. flush counter cache 626 in FIG. 6B). If there are no available slots, an entry can be evicted.

There can be multiple outstanding flush epochs and these active counters can be managed by the flush counter control logic 610. This is performed by maintaining two RAM pointers. The head pointer 612 points to the next available counter to be used for the next flush epoch. The second RAM pointer 614 is used track the first active flush epoch counter.

Every time a new flush counter is allocated, the head pointer is incremented by 1. Every time a flush counter is retired the tail pointer is incremented by 1. If the head wraps to the tail, the flush process is stopped until a currently used flush counter is retired from table 604.

Once a counter is moved from the flush epoch counter (e.g. active counter 628 shown in FIG. 6B) it is no longer incremented by new NPW conversions. This is because a new flush epoch is started and the posted writes associated with a new flush epoch are tracked separately. However, NPW responses can still arrive that are associated with previous flush epochs and egress decrements specific flush counters (e.g. in table 604 and/or cache 626).

When egress processes a response it first does a lookup on the PW/NPW table 616 using the tracking tag in the response as the index. The value retrieved from this lookup contains a pointer to the associated flush counter (e.g. in table 604). The backing store for the flush counter lives in the flush counter RAM. The flush counter RAM can have multiple sources making simultaneous read and write requests which would exceed the RAMs maximum access throughput. To work around the RAM's access constraint in order to optimize performance, a flush counter cache, a content addressable memory (CAM) and rate smoothing FIFO may be used.

In some embodiments, the counter corresponding to the current open flush epoch may be kept in a register, and the counters corresponding to the pre-flush epoch may be maintained in a table in RAM. In some embodiments, a predetermined number of flush counters can be maintained in registers, more efficiently enabling simultaneous flush request and flush response processing. In other embodiments, all counters may be in registers, and in yet other embodiments both may be in RAM.

FIG. 6B schematically illustrates another implementation of the flush control circuitry including a flush counter cache 626, CAM 622 and rate smoothing FIFO 620, according to some example embodiments.

The flush counter input FIFO 620 is used to queue up streaming response requests being processed by the egress pipeline. The processing of responses in the egress pipeline which includes forwarding endpoint generated non-posted responses or dropping switch generated responses is handled at link rate. However, because of the FIFO that sits between the tag remap FIFO and the flush counter FIFO 620 the processing of the flush counters is delayed. The flush FIFO is also used to provide a spill buffer if the egress response processing needs to be stalled to allow the flush counter processing flow to catch up.

The flush counter FIFO 620 is read to retrieve the next flush counter operation. This value is passed through a CAM 622 to check to see if the counter is currently loaded in the CAM. If the CAM sees a hit indicating the flush counter is resident in one of a certain number (e.g. 8) cache locations, the CAM provides the counter location in the cache 626. With this index the flush counter control logic 610 decrements the counter 624. If the counter has not reached 0, the count value is left in the cache.

When flush counter reaches a count of 0, a flush response must be forwarded out the egress port and the cache location freed. However, the flush response can't be forwarded unless all previous flushes have already been generated. To determine this the flush counter control logic 610 compares the flush counter values against the flush counter RAM tail pointer. If the flush counter value equals the tail pointer, the flush response can be processed. If not, the cached location is evicted from the cache and written back to RAM and processed after earlier flush responses have been processed.

If the flush response is generated, the flush counter control logic 610 may walk the RAM 626 looking for completed flushes (indicated by zero flush counts) and send those flush response as well. The logic 610 may do this by incrementing the tail pointer, reading the location and if zero generating the response and bumping the pointer. This process continues until the tail pointer reaches the head pointer or a non-zero count is found. When doing these reads the flush counter control logic 610 may check to see if the count value is already in the cache 626. If it is, the RAM read can be skipped.

In some embodiments, the flush response may indicate an error condition to the sender of the posted requests. For example, a timeout detected using the age field associated with a posted request or an response received including an error code to a converted non-posted request may cause the generation of the flush response indicating an error.

FIG. 6C schematically illustrates a timing diagram 600 showing certain example response sequence timing diagram according to some example embodiments.

In this sequence the egress pipe (pkt_pipeline signal) processes four consecutive response packets: RSP_FLSH[2], RSP_FLSH[3], RSP_FLSH[1], RSP_FLSH[0]. The tag remap control logic (e.g. tag remap RAM control 608) asserts the tag_ram_rd signal using the remapped tagID (e.g. Tag[2]. Tag[3], Tag[1], Tag[0]) from the respective response packets as the index address to the RAM (e.g. tag remap RAM 616). The results of these reads are forwarded to the flush counter FIFO and written by asserting the cntr_fifo_wr signal. Thereby Cntr[2], Cntr[3], Cntr[1], and Cntr[0] are written to the flush counter input FIFO. The flush counter control logic (e.g. flush counter control 610) monitors the flush counter FIFO and if it sees a non-empty FIFO status will begin reading the FIFO by asserting the fifo_read ("cntr_fifo_rd") signal. However, if ingress attempts a flush operation (see flush_req signal) during this time, there would be conflict on the counter RAM write port if the counter pointer from the FIFO missed the cache (e.g. flus_cam_miss signal). In this case the ingress pipeline may be configured to take priority because its pipeline can't stall.

The flush counter control 610 may stall its reads until the conflict is resolved (e.g. cntr_ram_rd signal). In the example shown in FIG. 6C, the eviction caused by the flush is sequenced first followed by the eviction caused by the counter FIFO read (e.g. cntr_ram_wr signal). As soon as the conflict is resolved, the flush counter control continues popping the FIFO. If the dual port RAM supports bypass mode, the last write/read operation can happen in one cycle.

The timing diagram illustrates how in one embodiment the hardware can structure the timing of operations in order to minimize the reads and writes on RAM. For example, the access to a dual-ported RAM that is accessed to write on incoming posted requests and to perform the converse when the responses to the converted non-posted requests are received. The diagram shows the RAM being read when the responses are received to match the received packet and perform processing. When a single packet comes in, the hardware can resolve the packet in a single cycle so as to avoid the fabric being backed up.

Method for Network Synchronization

Figure 7:
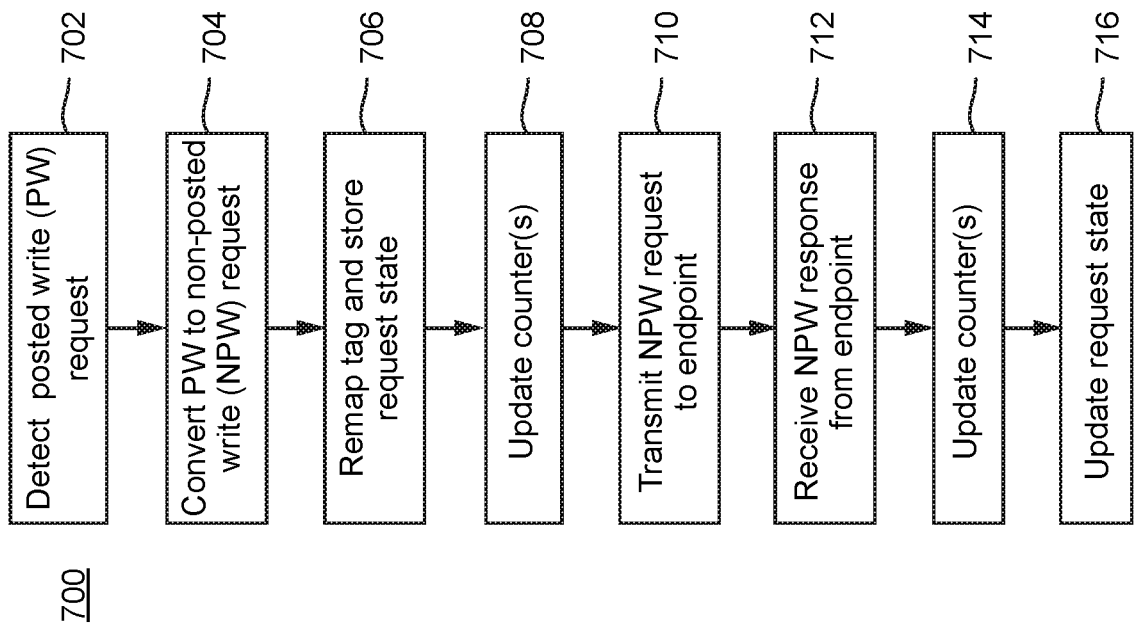
FIG. 7 illustrates a flowchart of a process for network synchronization using flush semantics, according to some example embodiments.

FIG. 7 illustrates a flowchart of a process 700 for network synchronization using flush semantics, according to some example embodiments. In some example embodiments, the process is performed in a switch such as switch 102 or 202. The process may be performed when one processor transmits a sequence of posted requests, such as posted write requests or posted atomics, to another processor through the switch. Example embodiments enable synchronizing the remote operations caused by such streams of posted transactions by one device with notifications to other devices that enable the other devices to consume the results of such remote operations. More specifically, as also described above, some example embodiments enable one device connected to a switch to stream posted requests followed by a flush request to one or more other devices on the switch so that a flush response can be received before a flag or the like is updated enabling others of the one or more devices to access the results of the stream of posted requests.

At operation 702, an incoming posted write request is detected. The detection may be performed in the circuitry associated with the ingress port. At operation 704, the posted write request is converted to a non-posted write request. The conversion is performed in order to use the destination endpoint's capability for sending a response to non-posted transactions. As noted above, the posted transactions do not elicit a response message from the destination endpoint. At operation 706, the original tag of the posted write request is replaced for the corresponding non-posted write request. The mappings are stored in a memory and maintained.

More details of the converting from posted request to non-posted request and the remapping of requests to tracking tags are provided above in relation to FIGS. 1A, 2 and 4. When the posted request is detected by, for example, in the Tag RAM control block 430, the request has its tag replaced and state stored in a tracking structure, such as, for example, a Tag Remap RAM 432. In addition the command type of the request is converted to a non-posted command before the corresponding packet or flit is forwarded to the route block.

Tag substitution is necessary because the posted request's tag can collide with a previously generated endpoint non-posted operation tag, or a newly arriving non-posted operation from the endpoint could collide with a tracked non-posted operation. To eliminate the possibility of collisions, both posted and non-posted commands arriving from the endpoint will have their tags substituted.

At operation 708 counters are updated in response to the received posted write requests. The counters are configured to keep track of the number of pending converted non-posted requests associated with each flush request. According to some embodiments, such as the embodiments described in relation to FIGS. 4-5, two counters 438 are used to keep track of the pending posted requests. According to some other embodiments, such as the embodiments described in relation to FIG. 6 (FIGS. 6A, 6B and 6C), the number of counters used to track the number of pending requests can be any number up to the number of the number (e.g. 1024) of supported outstanding requests. The updating of counters is described in detail above in relation to the noted figures.

At operation 710, the converted non-posted write request is transmitted to the destination endpoint. The transmission may be performed after determining the routing/forwarding information for the converted request. The routing forwarding information can be determined by the route interface 458, before the request is put on the switching fabric.

At operation 712, the response to the non-posted write request is received. As described above the endpoint is configured to generate a response to non-posted requests.

At operation 714, the counters are updated as a consequence of receiving the non-posted write response. The tracking tag of the response is used to access the tracking structure, such as, for example, the tag remap RAM 432, to locate the mapping entry corresponding to the received response. As noted above, the corresponding mapping entry has a counter pointer (cntr_ptr) that points to the flush-related counter which corresponds to the received response. Based on the counter pointer, the corresponding counter is decremented to represent receipt of a response to a non-posted write request. The use of counters as a state machine utilizing two counters is described above in relation to FIG. 4-5, and the use of a larger number of counters is described in relation to FIG. 6 above.

At operation 716, the request state is updated. After the relevant counters are updated, the mapping table entry may be removed. The tracking tag from the response is added back to the tag pool, such as, for example, tag pool 434. Moreover, if the received response was generated for an original non-posted request, then the response is sent back to the sending GPU. If the received response was generated for a converted non-posted request, then, since the original sending GPU does not expect a response, nothing is sent back to the sending GPU. Instead, in the case of converted non-posted requests, eventually a flush response is sent to the sender GPU (as described in relation to FIG. 8 below).

Figure 8:
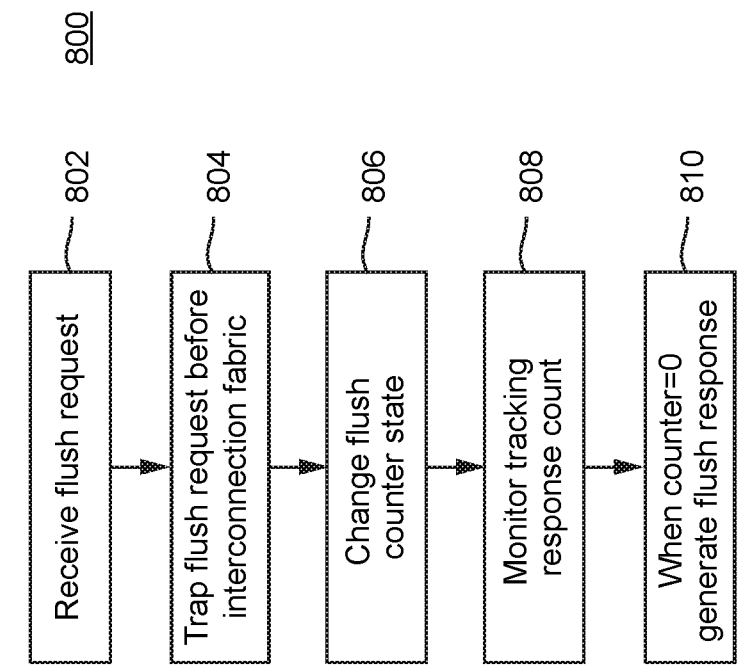
FIG. 8 illustrates a flowchart of a process for controlling the flush state associated with the process shown in FIG. 7, according to some example embodiments.

FIG. 8 illustrates a flowchart of a process for controlling the flush state associated with the process shown in FIG. 7, according to some example embodiments.

At operation 802, a flush request is received. As described above, a flush request is generated following a sequence of posted write requests by the producer (sending) GPU, and transmitted to the switch.

At operation 804, the incoming flush request is detected before it enters the switch fabric. The detected flush request can be trapped at the ingress port at the edge of the switch fabric before it enters the interconnection network of the switch fabric.

At operation 806, flush counter state is changed. The flush counter state may be maintained in a state machine, such as that described, for example, in FIG. 3 and in FIGS. 4 and 6 (e.g. counters 438 and 604).

At operation 808, the response count is tracked. The responses counts are based on the pending converted non-posted requests for which no response has yet been received. The count is monitored so that the state machine may undergo a state change when the response count becomes 0.

At operation 810, when the counter is equal to 0 a flush response is generated and transmitted to the producer GPU.

Parallel Processing Architectures Using Network Synchronization

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 9:
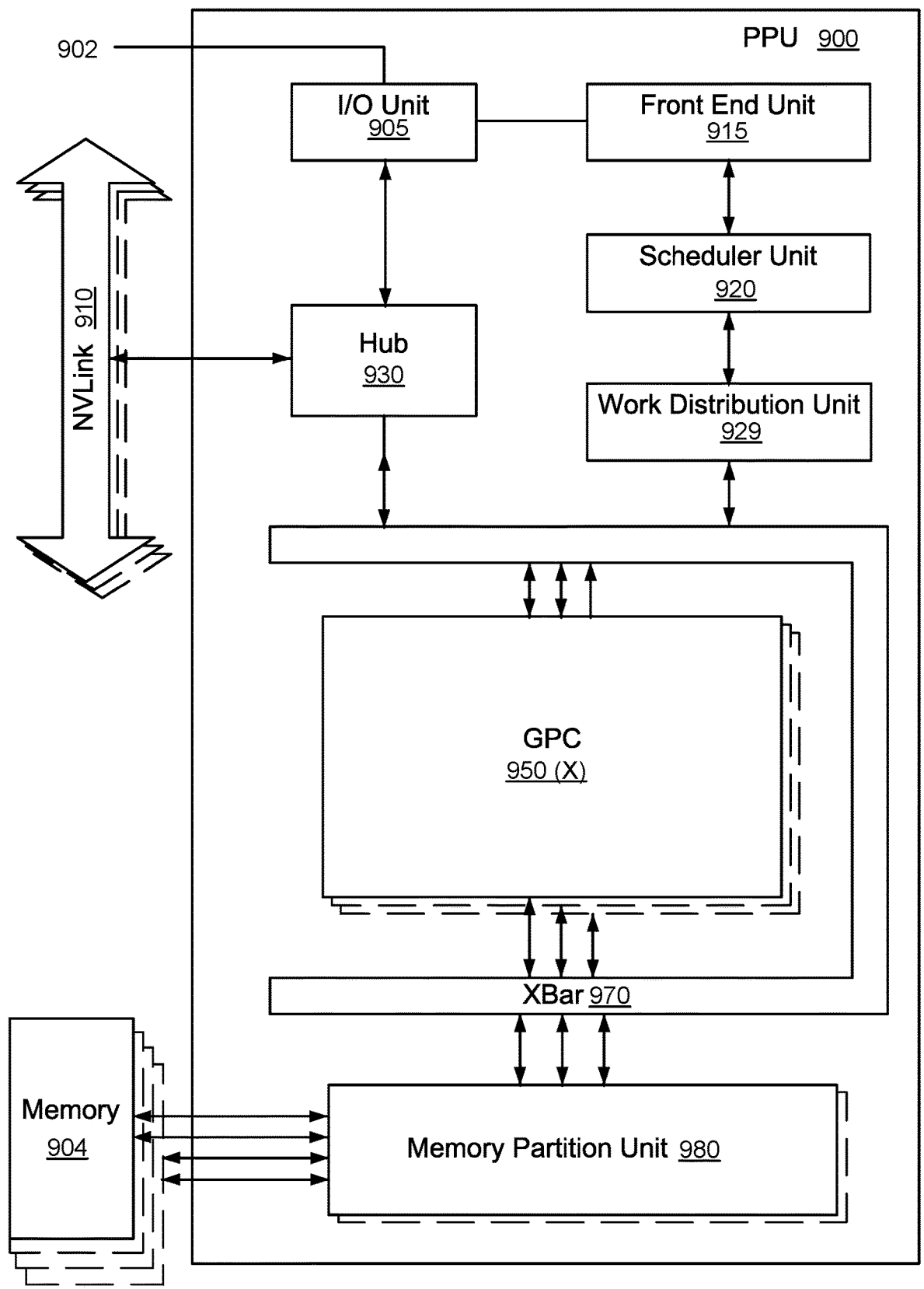
FIG. 9 illustrates a parallel processing unit that may be in a system shown in FIG. 1, in accordance with an embodiment.

FIG. 9 illustrates a parallel processing unit (PPU) 900, which may be interconnected with one or more other PPUs or other devices over a switch 100 according to some example embodiments. In an embodiment, the PPU 900 is a multi-threaded processor that is implemented on one or more integrated circuit devices. The PPU 900 is a latency hiding architecture designed to process many threads in parallel. A thread (e.g., a thread of execution) is an instantiation of a set of instructions configured to be executed by the PPU 900. In an embodiment, the PPU 900 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 900 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 900 may be configured to accelerate thousands of High Performance Computing (HPC), data center, and machine learning applications. The PPU 900 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 9, the PPU 900 includes an Input/Output (I/O) unit 905, a front end unit 915, a scheduler unit 920, a work distribution unit 925, a hub 930, a crossbar (Xbar) 970, one or more general processing clusters (GPCs) 950, and one or more partition units 980. The PPU 900 may be connected to a host processor or other PPUs 900 via one or more high-speed NVLink 910 interconnect. The PPU 900 may be connected to a host processor or other peripheral devices via an interconnect 902. The PPU 900 may also be connected to a local memory comprising a number of memory devices 904. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 910 interconnect enables systems to scale and include one or more PPUs 900 combined with one or more CPUs, supports cache coherence between the PPUs 900 and CPUs, and CPU mastering. Data and/or commands may be transmitted by the NVLink 910 through the hub 930 to/from other units of the PPU 900 such as one or more copy engines, a video encoder, a video decoder, a power management unit, etc. (not explicitly shown). The NVLink 910 is described in more detail in conjunction with FIG. 10.

The I/O unit 905 is configured to transmit and receive communications (e.g., commands, data, etc.) from a host processor (not shown) over the interconnect 902. The I/O unit 905 may communicate with the host processor directly via the interconnect 902 or through one or more intermediate devices such as a memory bridge. In an embodiment, the I/O unit 905 may communicate with one or more other processors, such as one or more of the PPUs 300 via the interconnect 902. In an embodiment, the I/O unit 305 implements a Peripheral Component Interconnect Express (PCIe) interface for communications over a PCIe bus and the interconnect 302 is a PCIe bus. In alternative embodiments, the I/O unit 905 may implement other types of well-known interfaces for communicating with external devices.

The I/O unit 905 decodes packets received via the interconnect 902. In an embodiment, the packets represent commands configured to cause the PPU 900 to perform various operations. The I/O unit 905 transmits the decoded commands to various other units of the PPU 900 as the commands may specify. For example, some commands may be transmitted to the front end unit 915. Other commands may be transmitted to the hub 930 or other units of the PPU 900 such as one or more copy engines, a video encoder, a video decoder, a power management unit, etc. (not explicitly shown). In other words, the I/O unit 905 is configured to route communications between and among the various logical units of the PPU 900.

In an embodiment, a program executed by the host processor encodes a command stream in a buffer that provides workloads to the PPU 900 for processing. A workload may comprise several instructions and data to be processed by those instructions. The buffer is a region in a memory that is accessible (e.g., read/write) by both the host processor and the PPU 900. For example, the I/O unit 905 may be configured to access the buffer in a system memory connected to the interconnect 302 via memory requests transmitted over the interconnect 902. In an embodiment, the host processor writes the command stream to the buffer and then transmits a pointer to the start of the command stream to the PPU 900. The front end unit 915 receives pointers to one or more command streams. The front end unit 915 manages the one or more streams, reading commands from the streams and forwarding commands to the various units of the PPU 900.

The front end unit 915 is coupled to a scheduler unit 920 that configures the various GPCs 950 to process tasks defined by the one or more streams. The scheduler unit 920 is configured to track state information related to the various tasks managed by the scheduler unit 920. The state may indicate which GPC 950 a task is assigned to, whether the task is active or inactive, a priority level associated with the task, and so forth. The scheduler unit 920 manages the execution of a plurality of tasks on the one or more GPCs 950.

The scheduler unit 920 is coupled to a work distribution unit 925 that is configured to dispatch tasks for execution on the GPCs 950. The work distribution unit 925 may track a number of scheduled tasks received from the scheduler unit 920. In an embodiment, the work distribution unit 925 manages a pending task pool and an active task pool for each of the GPCs 950. The pending task pool may comprise a number of slots (e.g., 32 slots) that contain tasks assigned to be processed by a particular GPC 950. The active task pool may comprise a number of slots (e.g., 4 slots) for tasks that are actively being processed by the GPCs 950. As a GPC 950 finishes the execution of a task, that task is evicted from the active task pool for the GPC 950 and one of the other tasks from the pending task pool is selected and scheduled for execution on the GPC 950. If an active task has been idle on the GPC 950, such as while waiting for a data dependency to be resolved, then the active task may be evicted from the GPC 350 and returned to the pending task pool while another task in the pending task pool is selected and scheduled for execution on the GPC 950.

The work distribution unit 925 communicates with the one or more GPCs 950 via XBar 970. The XBar 970 is an interconnect network that couples many of the units of the PPU 900 to other units of the PPU 900. For example, the XBar 970 may be configured to couple the work distribution unit 925 to a particular GPC 950. Although not shown explicitly, one or more other units of the PPU 900 may also be connected to the XBar 970 via the hub 930.

The tasks are managed by the scheduler unit 920 and dispatched to a GPC 950 by the work distribution unit 925. The GPC 950 is configured to process the task and generate results. The results may be consumed by other tasks within the GPC 950, routed to a different GPC 950 via the XBar 970, or stored in the memory 904. The results can be written to the memory 904 via the partition units 980, which implement a memory interface for reading and writing data to/from the memory 904. The results can be transmitted to another PPU 904 or CPU via the NVLink 910. In an embodiment, the PPU 900 includes a number U of partition units 980 that is equal to the number of separate and distinct memory devices 904 coupled to the PPU 900. A memory management unit (MMU) provides an interface between the GPC 950 and the partition unit 980. The MMU may provide translation of virtual addresses into physical addresses, memory protection, and arbitration of memory requests.

The memory partition unit 980 may include a Raster Operations (ROP) unit, a level two (L2) cache, and a memory interface. The memory interface is coupled to the memory 904. The memory interface may implement 32, 64, 128, 1024-bit data buses, or the like, for high-speed data transfer. In an embodiment, the PPU 900 incorporates U memory interfaces, one memory interface per pair of partition units 980, where each pair of partition units 980 is connected to a corresponding memory device 904. For example, PPU 900 may be connected to up to Y memory devices 904, such as high bandwidth memory stacks or graphics double-data-rate, version 5, synchronous dynamic random access memory, or other types of persistent storage.

In an embodiment, the memory interface implements an HBM2 memory interface and Y equals half U. In an embodiment, the HBM2 memory stacks are located on the same physical package as the PPU 900, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 904 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 900 process very large datasets and/or run applications for extended periods.

In an embodiment, the PPU 300 implements a multi-level memory hierarchy. In an embodiment, the memory partition unit 980 supports a unified memory to provide a single unified virtual address space for CPU and PPU 900 memory, enabling data sharing between virtual memory systems. In an embodiment the frequency of accesses by a PPU 900 to memory located on other processors is traced to ensure that memory pages are moved to the physical memory of the PPU 900 that is accessing the pages more frequently. In an embodiment, the NVLink 910 supports address translation services allowing the PPU 900 to directly access a CPU's page tables and providing full access to CPU memory by the PPU 900.

In an embodiment, copy engines transfer data between multiple PPUs 900 or between PPUs 900 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 904 or other system memory may be fetched by the memory partition unit 980 and stored in the L2 cache, which is located on-chip and is shared between the various GPCs 950. As shown, each memory partition unit 980 includes a portion of the L2 cache associated with a corresponding memory device 904. Lower level caches may then be implemented in various units within the GPCs 950. For example, each of the streaming multiprocessors (SMs) in the GPC may implement a level one (L1) cache. The L1 cache is private memory that is dedicated to a particular SM. Data from the L2 cache may be fetched and stored in each of the L1 caches for processing in the functional units of the SMs. The L2 cache is coupled to the memory interface and the XBar 970.

In an embodiment, a host processor executes a driver kernel that implements an application programming interface (API) that enables one or more applications executing on the host processor to schedule operations for execution on the PPU 900. In an embodiment, multiple compute applications are simultaneously executed by the PPU 900 and the PPU 900 provides isolation, quality of service (QoS), and independent address spaces for the multiple compute applications. An application may generate instructions (e.g., API calls) that cause the driver kernel to generate one or more tasks for execution by the PPU 900. The driver kernel outputs tasks to one or more streams being processed by the PPU 900. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory.

The PPU 900 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 900 is embodied on a single semiconductor substrate. In another embodiment, the PPU 900 is included in a system-on-a-chip (SoC) along with one or more other devices such as additional PPUs 900, the memory 904, a reduced instruction set computer (RISC) CPU, a memory management unit (MMU), a digital-to-analog converter (DAC), and the like.

In an embodiment, the PPU 900 may be included on a graphics card that includes one or more memory devices 904. The graphics card may be configured to interface with a PCIe slot on a motherboard of a desktop computer. In yet another embodiment, the PPU 900 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 10:
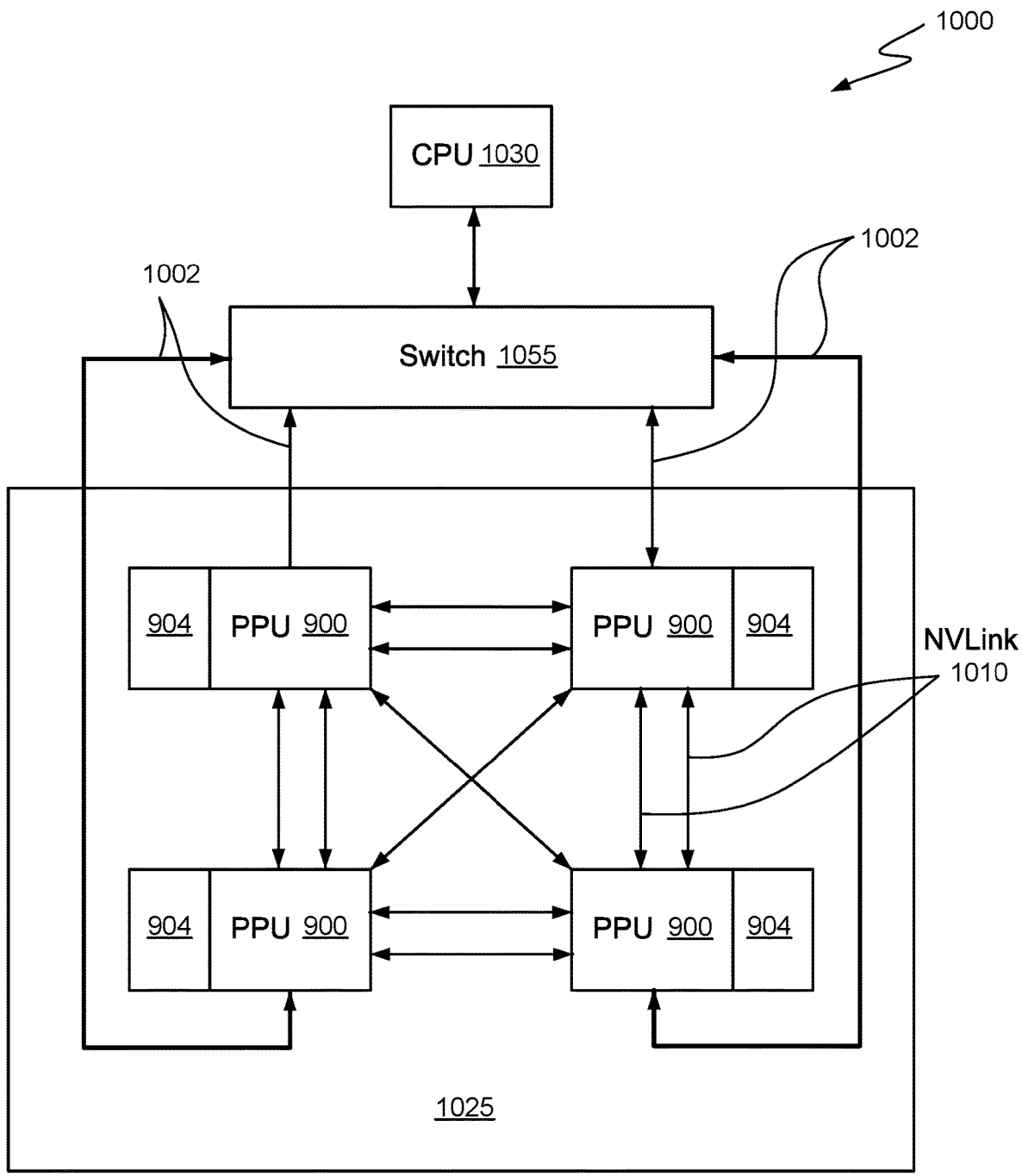
FIG. 10 is a conceptual diagram of a processing system implemented using the parallel processing unit (PPU) of FIG. 9, in accordance with an embodiment.

FIG. 10 is a conceptual diagram of a processing system 1000 implemented using the PPU 900 of FIG. 9, in accordance with an embodiment. The exemplary system 1000 may be configured to implement the methods shown in FIGS. 7 and 8 and/or the logic described in relation to any of FIGS. 2-6. The processing system 1000 includes a CPU 1030, switch 1055, and multiple PPUs 900 each and respective memories 904. The NVLink 1010 provides high-speed communication links between each of the PPUs 900. Although a particular number of NVLink 1010 and interconnect 1002 (which may also be NVLINK) connections are illustrated in FIG. 1000, the number of connections to each PPU 900 and the CPU 1030 may vary. The switch 1055 interfaces between the interconnect 1002 and the CPU 1030. The PPUs 900, memories 904, and NVLinks 1010 may be situated on a single semiconductor platform to form a parallel processing module 1025. In an embodiment, the switch 1055 supports two or more protocols to interface between various different connections and/or links.

In another embodiment, the NVLink 1010 provides one or more high-speed communication links between each of the PPUs 900 and the CPU 1030 and the switch 1055 interfaces between the interconnect 1002 and each of the PPUs 900. The PPUs 900, memories 904, and interconnect 1002 may be situated on a single semiconductor platform to form a parallel processing module 1025. In yet another embodiment, the interconnect 1002 provides one or more communication links between each of the PPUs 900 and the CPU 1030 and the switch 1055 interfaces between each of the PPUs 900 using the NVLink 1010 to provide one or more high-speed communication links between the PPUs 900. In another embodiment, the NVLink 1010 provides one or more high-speed communication links between the PPUs 900 and the CPU 1030 through the switch 1055. In yet another embodiment, the interconnect 1002 provides one or more communication links between each of the PPUs 900 directly. One or more of the NVLink 1010 high-speed communication links may be implemented as a physical NVLink interconnect or either an on-chip or on-die interconnect using the same protocol as the NVLink 1010.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1025 may be implemented as a circuit board substrate and each of the PPUs 900 and/or memories 904 may be packaged devices. In an embodiment, the CPU 1030, switch 1055, and the parallel processing module 1025 are situated on a single semiconductor platform.

In an embodiment, the signaling rate of each NVLink 910 is 20 to 25 Gigabits/second and each PPU 300 includes six NVLink 910 interfaces (as shown in FIG. 10, five NVLink 1010 interfaces are included for each PPU 900). Each NVLink 910 provides a data transfer rate of 25 Gigabytes/second in each direction, with six links providing 300 Gigabytes/second. The NVLinks 910 can be used exclusively for PPU-to-PPU communication as shown in FIG. 10, or some combination of PPU-to-PPU and PPU-to-CPU, when the CPU 1030 also includes one or more NVLink 910 interfaces.

In an embodiment, the NVLink 910 allows direct load/store/atomic access from the CPU 1030 to each PPU's 900 memory 904. In an embodiment, the NVLink 910 supports coherency operations, allowing data read from the memories 904 to be stored in the cache hierarchy of the CPU 1030, reducing cache access latency for the CPU 1030. In an embodiment, the NVLink 910 includes support for Address Translation Services (ATS), allowing the PPU 900 to directly access page tables within the CPU 1030. One or more of the NVLinks 910 may also be configured to operate in a low-power mode.

Figure 11:
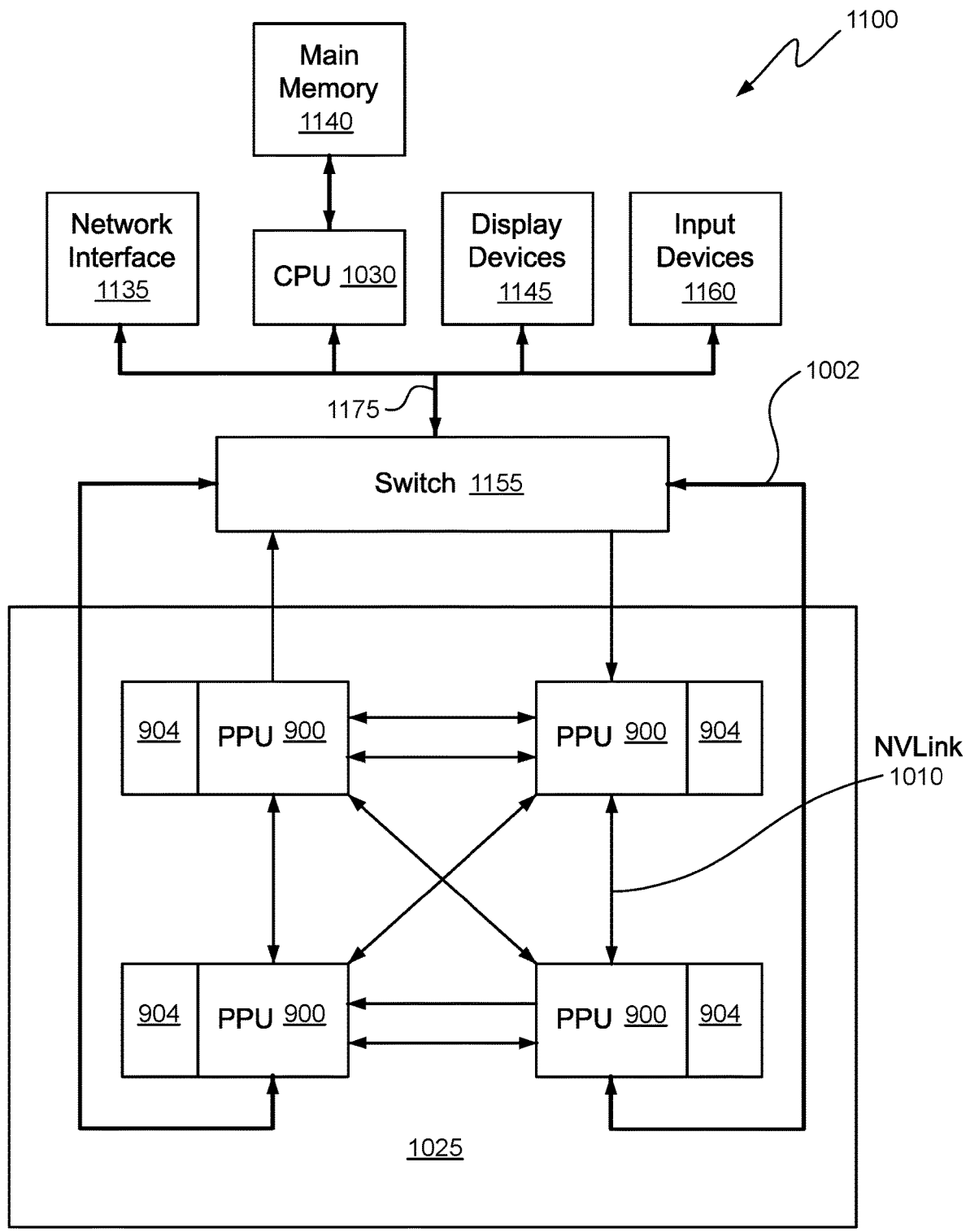
FIG. 11 illustrates an exemplary system in which the various architecture and/or functionality of the various previous embodiments may be implemented.

FIG. 11 illustrates an exemplary system 1100 in which the various architecture and/or functionality of the various previous embodiments may be implemented. The switch 1155 in exemplary system 1100 may be configured to implement the methods shown in FIGS. 7 and 8 and/or the logic described in relation to any of FIGS. 2-6. For example, in a manner similar to switch 1055 described above, switch 1155 provides for interconnectivity between multiple PPUs on a module 1025. The interconnectivity from the switch 1155 to the PPUs may be based on NVLINK or other interconnection 1102 that operates consistently with the descriptions of methods 700 and 800.

System 1100 is provided including at least one central processing unit 1030 that is connected to a communication bus 1175. The communication bus 1175 may be implemented using any suitable protocol, such as PCI (Peripheral Component Interconnect), PCI-Express, AGP (Accelerated Graphics Port), HyperTransport, or any other bus or point-to-point communication protocol(s). The system 1100 also includes a main memory 1140. Control logic (software) and data are stored in the main memory 1140 which may take the form of random access memory (RAM).

The system 1100 also includes input devices 1160, the parallel processing system 1025, and display devices 1145, e.g. a conventional CRT (cathode ray tube), LCD (liquid crystal display), LED (light emitting diode), plasma display or the like. User input may be received from the input devices 1160, e.g., keyboard, mouse, touchpad, microphone, and the like. Each of the foregoing modules and/or devices may even be situated on a single semiconductor platform to form the system 1100. Alternately, the various modules may also be situated separately or in various combinations of semiconductor platforms per the desires of the user.

Further, the system 1100 may be coupled to a network (e.g., a telecommunications network, local area network (LAN), wireless network, wide area network (WAN) such as the Internet, peer-to-peer network, cable network, or the like) through a network interface 1135 for communication purposes.

The system 1100 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1140 and/or the secondary storage. Such computer programs, when executed, enable the system 1100 to perform various functions. The memory 1140, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1100 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Various programs may be executed within the PPU 900 in order to implement the various stages of a graphics processing pipeline. For example, the device driver may launch a kernel on the PPU 900 to perform the vertex shading stage on one SM (or multiple SMs). The device driver (or the initial kernel executed by the PPU 900) may also launch other kernels on the PPU 900 to perform other stages of the graphics processing pipeline, such as the geometry shading stage and the fragment shading stage. In addition, some of the stages of a graphics processing pipeline may be implemented on fixed unit hardware such as a rasterizer or a data assembler implemented within the PPU 900. It will be appreciated that results from one kernel may be processed by one or more intervening fixed function hardware units before being processed by a subsequent kernel on an SM.

Machine Learning

Deep neural networks (DNNs) developed on processors, such as the PPU 900 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Example Technical Advantages of Some Embodiments

Certain example embodiments provide for improved performance of device-to-device communication, such as, for example, GPU-to-GPU communication. The improvements are due at least partly to the increased efficiency of the flush semantics implementation in the interconnecting switch. The improved flush semantics implementation of example embodiments eliminates or at least substantially reduces the occurrence of storms of flush requests that can occur in implementations that do not implement the improved flush semantics.

The improved performance facilitates the multi-GPU clusters by enabling faster and more efficient communication between the GPUs for sharing processing resources and also memory resources. The improved communication enables the creation of multi-GPU clusters and the like that each GPU in the cluster can leverage the other GPUs' memory and other resources providing for large clusters with large amounts of processing and memory resources. Such multi-GPU environments can be beneficial for various applications that involve large amounts of data such as, but not limited to, machine learning, autonomous vehicle navigation, complex graphics processing, complex virtual reality processing, and various physics applications.

Note that although the conversion of posted requests to non-posted requests requires each posted request to in effect be acknowledged by the destination endpoint, because most practical uses required a stream of posted requests to be followed by a flush request, embodiments are not expected to slow applications that rely on posted requests. On the contrary, the prevention of flush storms in the fabric is expected to yield wide ranging benefits by reducing congestion in the fabric.

Numerous modifications and variations of the present invention are possible in light of the above teachings. It is therefore to be understood that within the scope of the appended claims, the invention may be practiced otherwise than as specifically described herein.

What is claimed is:

1. A method of synchronizing transactions on a switch fabric, comprising:
   receiving one or more posted transactions from at least one source device, followed by a flush transaction;
   transmitting transactions corresponding to the one or more posted transactions received from the at least one source device to at least one sink device over the switch fabric;
   trapping the received flush transaction at an ingress edge of the switch fabric;
   monitoring acknowledgments received from the at least one sink device in response to the transmitted one or more transactions; and
   returning a response to the flush transaction based on the monitoring.

2. The method according to claim 1, further comprising converting the received one or more posted transactions to non-posted transactions, wherein the transmitting transactions includes transmitting the converted non-posted transactions.

3. The method according to claim 2, wherein the monitoring comprises using a predetermined number of counters to associate respective transmitted transactions with respective received flush transactions.

4. The method according to claim 3, wherein the returning a response comprises generating the response based on one of the counters.

5. The method according to claim 3, wherein the predetermined number is 2.

6. The method according to claim 3, wherein the predetermined number of counters is unrelated to a number of received flush transactions.

7. The method according to claim 2, wherein the monitoring further comprises using the predetermined number of counters to associate respective received acknowledgements with the respective received flush transactions.

8. The method according to claim 2, further comprising replacing a tag of each of the one or more received posted transactions using a set of predetermined tags.

9. The method according to claim 8, further comprising removing a tag from the set of predetermined tags to replace an original tag for each of the one or more received posted transactions, and adding a tag from each of the one or more received acknowledgments to the set of predetermined tags.

10. The method according to claim 1, wherein said returning a response satisfies a condition that said returned response to the flush transaction corresponds to all of said one or more posted transactions received before said flush transaction.

11. The method according to claim 1, wherein the one or more posted transactions include at least one of a posted write request or a posted atomic request.

12. The method according to claim 1, wherein said response to the flush transaction is obtained without transmitting the flush transaction on the switch fabric.

13. The method according to claim 1, further comprising maintaining an age associated with respective transmitted transactions, and detecting lost packets associated with respective ones of said transmitted transactions based upon the age.

14. The method according to claim 1, wherein the returning a response comprises detecting an error condition associated with one or more transmitted transactions, and including an indication of error in the returned response.

15. A communications interconnect, comprising:
a plurality of interfaces, each interface being configured to receive and/or transmit transactions from/to one or more processing devices; and
flush control circuitry connected to the plurality of interfaces and configured to:
receive one or more posted transactions followed by a flush transaction;
transmit transactions corresponding to the one or more posted transactions;
trap the received flush transaction;
monitor acknowledgments sent in response to the transmitted one or more transactions; and
return a response to the flush transaction based on the monitoring.

16. The communication interconnect according to claim 15, wherein the flush control circuitry comprises a predetermined number of counters for keeping track of received flush transactions and received posted transactions associated with respective ones of the received flush transactions, the predetermined number of counters being less than a number of the received flush transactions.

17. The communication interconnect according to claim 15, wherein the flush control circuitry comprises one or more of the counters being maintained in a multi-ported memory supporting simultaneous access.

18. The communication interconnect according to claim 15, wherein the flush control circuitry comprises a dual-ported memory storing a plurality of mapping entries, each mapping entry corresponding to a pending one of the transmitted transactions.

19. The communication interconnect according to claim 18, wherein the flush control circuitry further comprises a plurality of tracking tags, and wherein the flush control circuitry is further configured to replace a tag of each of the one or more received posted transactions using one of said tracking tags.

20. The communication interconnect according to claim 19, wherein the flush control circuitry is further configured to convert the received one or more posted transactions to non-posted transactions, wherein the transmitting transactions includes transmitting the converted non-posted transactions.

21. The communication interconnect according to claim 20, wherein the flush control circuitry is further configured to maintain an age associated with each of the mapping entries.

22. The communication interconnect according to claim 15, wherein a respective instance of the flush control circuitry is connected each of the plurality of interfaces.

23. The communication interconnect according to claim 22, wherein the respective instance of the flush control circuitry is configured to trap said received flush request before the received flush request is forwarded on a forwarding network that interconnects the plurality of interfaces.

* * * * *